United States Patent
Ishibashi

(10) Patent No.: US 8,902,458 B2
(45) Date of Patent: Dec. 2, 2014

(54) INFORMATION PROCESSING APPARATUS, JOB PROCESSING SYSTEM, AND JOB PROCESSING METHOD

(75) Inventor: Yuki Ishibashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 135 days.

(21) Appl. No.: 13/604,405

(22) Filed: Sep. 5, 2012

(65) Prior Publication Data

US 2013/0070296 A1 Mar. 21, 2013

(30) Foreign Application Priority Data

Sep. 16, 2011 (JP) .................................. 2011-203713
Feb. 13, 2012 (JP) .................................. 2012-028843

(51) Int. Cl.
G06F 3/12 (2006.01)
G06K 15/00 (2006.01)

(52) U.S. Cl.
CPC ............ *G06F 3/1207* (2013.01); *G06F 3/1273* (2013.01); *G06F 3/1267* (2013.01); *G06F 3/1222* (2013.01); *G06F 3/1261* (2013.01); *G06F 3/1234* (2013.01); *G06F 3/1291* (2013.01); *G06F 3/1285* (2013.01); *G06F 3/121* (2013.01); *G06F 3/1259* (2013.01); *G06F 3/1238* (2013.01)
USPC .......... 358/1.15; 358/1.1; 358/1.13; 358/1.14; 358/1.16

(58) Field of Classification Search
USPC ....................... 358/1.15, 1.14, 1.16, 1.13, 1.1; 713/185, 182, 183, 184, 163, 159, 155, 713/152, 151; 726/30, 1, 3, 2, 4, 9, 10, 14, 726/17, 20, 21, 27, 28, 31
See application file for complete search history.

(56) References Cited

U.S. PATENT DOCUMENTS

| 2007/0101153 | A1* | 5/2007 | Kawaji ........................... 713/185 |
| 2007/0195360 | A1 | 8/2007 | Sagata |
| 2010/0002249 | A1 | 1/2010 | Nuggehalli et al. |
| 2010/0208298 | A1* | 8/2010 | Kitagata ....................... 358/1.15 |
| 2010/0328720 | A1* | 12/2010 | Suzuki ........................... 358/1.15 |

FOREIGN PATENT DOCUMENTS

| JP | 08-272557 | 10/1996 |
| JP | 2007-203716 | 8/2007 |
| JP | 2007-223155 | 9/2007 |
| JP | 2007-257015 | 10/2007 |
| JP | 2010-012785 | 1/2010 |

* cited by examiner

*Primary Examiner* — Ngon Nguyen
(74) *Attorney, Agent, or Firm* — Harness, Dickey & Pierce, P.L.C.

(57) ABSTRACT

An information processing apparatus is operable to be connected to a first external apparatus and one or more second external apparatuses. The first external apparatus receives and stores therein a job and first identification information. The one or more second external apparatus transmits second identification information to the first external apparatus, acquires and executes the job associated with the first identification information specified based on the second identification information. The information processing apparatus includes: a job transmitting unit that transmits the job and the first identification information to the first external apparatus; a requesting unit that requests state information from the first external apparatus; and a state receiving unit that receives state information, indicating a first stage in which the job is accumulated in the first external apparatus and a second stage in which the job is executed, as the state information.

13 Claims, 31 Drawing Sheets

| JOB ID |
|---|
| ABC00011 |
| ABC00012 |
| ABC00013 |
| ⋮ |

| JOB ID | AUTHENTICATION INFORMATION |
|---|---|
| ABC00001 | ?????????? |
| ABC00002 | ?????????? |
| ABC00003 | ?????????? |
| ⋮ | ⋮ |

| JOB ID | STATE |
|---|---|
| ABC00001 | ACCUMULATED |
| ABC00002 | BEING RECEIVED |
| ABC00003 | ACCUMULATED |
| ⋮ | ⋮ |

FIG.13

| JOB ID | START TIME | JOB STATE | NAME OF OUTPUT APPARATUS | APPARATUS STATE | NAME OF DOCUMENT |
|---|---|---|---|---|---|
| Pc001-20110201-103025-xxx | 2010-10-06 11:10 | CANCELED | FIRST MFP | STORAGE FULL | FIRST DOCUMENT |
| Pc001-20110201-130533-yyy | 2010-10-06 11:05 | DATA DESTROY | SECOND MFP | NORMAL | SECOND DOCUMENT |
| Pc001-20110201-151515-zzz | 2010-09-30 14:21 | SUCCEED | FIRST MFP | NORMAL | THIRD DOCUMENT |
| ... | ... | ... | ... | ... | ... |

FIG.14

```
<Job History>
 <Count>100</Count>
 <JobID> Pc001-20110201-103025-xxx </JobID>
  <start> 20101006-111021 </start>
  <job status> canceled </job status>
  <output> FIRST MFP </output>
  <condition> Storage FULL </condishon>
  <document> FIRST DOCUMENT </document>
 <JobID> Pc001-20110201-130533-yyy </JobID>
  <start> 20101006-110511 </start>
  <job status> data destroy </job status>
  <output> SECOND MFP </output>
  <condition> Normal </condishon>
  <document> SECOND DOCUMENT </document>
 <JobID> Pc001-20110201-151515-zzz </JobID>
  <start> 20100930-142122 </start>
  <job status> succeed </job status>
  <output> FIRST MFP </output>
  <condition> Normal </condishon>
  <document> THIRD DOCUMENT </document>
         .
         .
         .
 /<Job History>
```

FIG.15

| NAME OF DOCUMENT | JOB STATE | START TIME | PRINTER |
|---|---|---|---|
| FIRST DOCUMENT | CANCELLED | 2010-10-06 11:10 | FIRST MFP |
| SECOND DOCUMENT | ERROR DATA CORRUPTION | 2010-10-06 11:05 | SECOND MFP |
| THIRD DOCUMENT | PRINTING IS COMPLETED | 2010-09-30 14:21 | FIRST MFP |
| TEST PAGE | PRINTING IS COMPLETED | 2010-09-29 20:51 | FIRST MFP |
| FOURTH DOCUMENT | DATA TRANSFER IS INTERRUPTED | 2009-10-23 16:04 | FIRST MFP |
| FIFTH DOCUMENT | PRINTING IS COMPLETED | 2009-10-21 10:58 | SECOND MFP |
| SIXTH DOCUMENT | PRINTING IS COMPLETED | 2009-10-21 10:55 | SECOND MFP |
| SEVENTH DOCUMENT | PRINTING IS COMPLETED | 2009-10-21 10:53 | SECOND MFP |
| TEST PAGE | PRINTING IS COMPLETED | 2009-10-21 10:51 | FIRST MFP |
| TEST PAGE | PRINTING IS COMPLETED | 2009-10-21 10:49 | FIRST MFP |
| TEST PAGE | PAPER IS JAMMING | 2009-09-29 10:20 | FIRST MFP |

LIST OF JOBS
PRINTER (P)  VIEW (V)  HELP (H)

FIG.16

| NAME OF DOCUMENT | JOB STATE | START TIME | PRINTER |
|---|---|---|---|
| FIRST DOCUMENT | CANCELLED | 2010-10-06 11:10 | FIRST MFP |
| SECOND DOCUMENT | ERROR DATA CORRUPTION | 2010-10-06 11:05 | SECOND MFP |
| FOURTH DOCUMENT | DATA TRANSFER IS INTERRUPTED | 2009-10-23 16:04 | FIRST MFP |
| TEST PAGE | PAPER IS JAMMING | 2009-09-29 10:20 | FIRST MFP |

LIST OF JOBS
PRINTER (P)  VIEW (V)  HELP (H)

FIG.17

| NAME OF DOCUMENT | JOB STATE | START TIME | PRINTER |
|---|---|---|---|
| THIRD DOCUMENT | PRINTING IS COMPLETED | 2010-09-30 14:21 | FIRST MFP |
| TEST PAGE | PRINTING IS COMPLETED | 2010-09-29 20:51 | FIRST MFP |
| FIFTH DOCUMENT | PRINTING IS COMPLETED | 2009-10-21 10:58 | SECOND MFP |
| SIXTH DOCUMENT | PRINTING IS COMPLETED | 2009-10-21 10:55 | SECOND MFP |
| SEVENTH DOCUMENT | PRINTING IS COMPLETED | 2009-10-21 10:53 | SECOND MFP |
| TEST PAGE | PRINTING IS COMPLETED | 2009-10-21 10:51 | FIRST MFP |
| TEST PAGE | PRINTING IS COMPLETED | 2009-10-21 10:49 | FIRST MFP |

LIST OF JOBS — PRINTER (P) VIEW (V) HELP (H)

FIG.18

IN-BOX | PRINT ACCUMULATION IS COMPLETED. IN-BOX...

SENDER FIRST MFP
SUBJECT PRINT ACCUMULATION IS COMPLETED
ADDRESS MYSELF ☆

PRINT ACCUMULATION IS COMPLETED AS FOLLOWS.

PRINTER: FIRST MFP
LOCATION: HEAD OFFICE 10F

NAME OF DOCUMENT: MATERIAL FOR CONFERENCE IN AFTERNOON AT HEAD OFFICE
NUMBER OF PAGES: 10 PAGES
STYLE: 2-in-1 DUPLEXING
NUMBER OF COPIES: 20 COPIES

NUMBER OF UNREAD MESSAGES: 1421 | TOTAL: 1722

FIG.30
| LIST OF JOBS | | | |
|---|---|---|---|
| PRINTER (P) VIEW (V) HELP (H) | | | |
| NAME OF DOCUMENT | JOB STATE | START TIME | PREVIEW IMAGE |
| FIRST DOCUMENT | CANCELLED | 2010-10-06 11:10 |  |
| SECOND DOCUMENT | ERROR DATA CORRUPTION | 2010-10-06 11:05 | 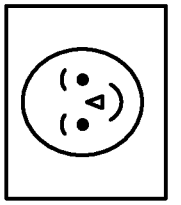 |
| THIRD DOCUMENT | PRINTING IS COMPLETED | 2010-09-30 14:21 | 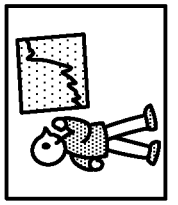 |

FIG.33

| JOB ID | AUTHENTICATION INFORMATION | PRINT SETTING INFORMATION |
|---|---|---|
| ABC00001 | ?????????? | ...... |
| ABC00002 | ?????????? | ...... |
| ABC00003 | ?????????? | ...... |
| ⋮ | ⋮ | ⋮ |

FIG.34

| JOB ID | START TIME | SIZE | BINARY |
|---|---|---|---|
| Pc001-20110201-103025-xxx | 2010-10-06 11:10 | xxxx1 | ...... |
| Pc001-20110201-130533-yyy | 2010-10-06 11:05 | xxxx2 | ...... |
| ⋮ | ⋮ | ⋮ | ⋮ |

FIG.35

| JOB ID | START TIME | JOB STATE | NAME OF OUTPUT APPARATUS | APPARATUS STATE | NAME OF DOCUMENT | PRINT SETTING INFORMATION |
|---|---|---|---|---|---|---|
| Pc001-20110201-103025-xxx | 2010-10-06 11:10 | CANCELED | FIRST MFP | STORAGE FULL | FIRST DOCUMENT | xxxxx |
| Pc001-20110201-130533-yyy | 2010-10-06 11:05 | DATA DESTROY | SECOND MFP | NORMAL | SECOND DOCUMENT | xxxxx |
| Pc001-20110201-151515-zzz | 2010-09-30 14:21 | SUCCEED | FIRST MFP | NORMAL | THIRD DOCUMENT | xxxxx |
| ... | ... | ... | ... | ... | ... | ... |

INFORMATION PROCESSING APPARATUS, JOB PROCESSING SYSTEM, AND JOB PROCESSING METHOD

CROSS-REFERENCE TO RELATED APPLICATIONS

The present application claims priority to and incorporates by reference the entire contents of Japanese Patent Application No. 2011-203713 filed in Japan on Sep. 16, 2011 Japanese Patent Application No. 2012-028843 filed in Japan on Feb. 13, 2012.

BACKGROUND OF THE INVENTION

1. Field of the Invention

The present invention relates to an information processing apparatus, a job processing system, and a job processing method.

2. Description of the Related Art

A technology is conventionally used in which an information processing apparatus and a print processing apparatus is connected via a network and the print processing apparatus performs printing of a print job output from the information processing apparatus. An example of related art is described in Japanese Patent Application Laid-open No. 8-272557.

There has been developed a technology of displaying a state of a print job in response to a query output from an information processing apparatus to a print processing apparatus or the like in order to allow a user to grasp the state of the print job.

To increase security against illegal use and illegal taking out for a user, there has been developed a secure print function as follows: a print job transmitted by an information processing apparatus is temporarily accumulated in a print processing apparatus or a print server; a user goes to a desired print processing apparatus to perform printing of the print job thus accumulated; and success in user authentication enables the user to perform printing of the print job thus accumulated.

If the secure print function is used, the user has to go to a print processing apparatus and perform user authentication in order to execute a print job using the print processing apparatus. Therefore, it is possible to increase security against illegal use and illegal taking out.

If the secure print function described above is used, however, the print job transmitted from the information processing apparatus is not printed immediately, but is accumulated. As a result, if the user checks for the state of the print job from the information processing apparatus, the user can only grasp the state of the print job as far as a stage in which the print job is accumulated. In particular, if the print job is temporarily accumulated in a server device, such as a print server, it is not necessarily determined which print processing apparatus is to be used for the printing at the time of accumulation of the print job. As a result, the information processing apparatus cannot acquire a state of the print job indicating whether the print job has been executed, etc.

There is a need to provide an information processing apparatus, a job processing system, and a job processing method that facilitate grasping a state of a job.

SUMMARY OF THE INVENTION

It is an object of the present invention to at least partially solve the problems in the conventional technology.

An information processing apparatus is operable to be connected to a first external apparatus and one or more second external apparatuses in a communicable manner via a network. The first external apparatus receives a job and first identification information transmitted from the outside and stores therein the job and the first identification information in a manner associated with each other. The one or more second external apparatus transmits second identification information to the first external apparatus, acquires the job associated with the first identification information specified based on the second identification information from the first external apparatus, and executes the job. The information processing apparatus includes: a job transmitting unit that transmits the job and the first identification information to the first external apparatus; a requesting unit that requests state information indicating a state of the job capable of being executed by any one of the one or more second external apparatuses and associated with the first identification information transmitted to the first external apparatus, from the first external apparatus; and a state receiving unit that receives state information, indicating a first stage in which the job is accumulated in the first external apparatus and a second stage in which the job acquired from the first external apparatus is executed by any one of the one or more second external apparatuses, as the state information of the job associated with the first identification information from the first external apparatus.

A job processing system includes: an information processing apparatus; a job management apparatus that receives a job and first identification information transmitted from the outside and that stores therein the job and the first identification information in a manner associated with each other; and one or more job execution apparatuses that transmit second identification information to the job management apparatus, acquire the job, associated with the first identification information specified based on the second identification information, from the job management apparatus, and execute the job. The information processing apparatus, the job management apparatus, and the one or more job execution apparatuses are connected in a communicable manner. The information processing apparatus includes: a first job transmitting unit that transmits the job and the first identification information to the job management apparatus; a requesting unit that requests state information, indicating a state of the job capable of being executed by any one of the one or more job execution apparatuses and associated with the first identification information transmitted to the job management apparatus, from the job management apparatus; and a state receiving unit that receives state information, indicating a first stage in which the job is accumulated in the job management apparatus and a second stage in which the job acquired from the job management apparatus is executed by any one of the one or more job execution apparatuses as the state information of the job associated with the first identification information, from the job management apparatus. The job management apparatus includes: a job receiving unit that receives the job and the first identification information from the information processing apparatus; a job storage unit that stores and accumulates the job and the first identification information received by the job receiving unit in a storage unit in a manner associated with each other; a state information storage unit that registers and stores therein state information of the job accumulated by the job storage unit in the first stage; an identification information receiving unit that receives second identification information from one of the one or more job execution apparatuses; a second job transmitting unit that transmits the job to the one of the one or more job execution apparatuses, the job being stored by the job storage unit and associated with the first identification information specified by the second identification information, the state information of the job being at the first stage; an updating unit that updates, when the job transmitted by the second job transmitting unit is executed by the one of the one or more job execution apparatus that is a transmission destination, the state information at the first stage with the state information at the second stage; a receiving unit that receives a request from the requesting unit of the information processing apparatus; and a state transmitting unit that transmits the state information, specified by the request received by the receiving unit and associated with the first identification information, to the information processing apparatus.

A job processing method is performed in a job processing system including an information processing apparatus, a job management apparatus and one or more job execution apparatuses. The information processing apparatus, the job management apparatus, and the one or more job execution apparatuses are connected in a communicable manner. The job processing method includes: receiving, by the job management apparatus, a job and first identification information transmitted from the outside; storing therein, by the job management apparatus, the job and the first identification information in a manner associated with each other; transmitting, by one of the one or more job execution apparatuses, second identification information to the job management apparatus; acquiring, by the one of the one or more job execution apparatuses, the job, associated with the first identification information specified based on the second identification information, from the job management apparatus; and executing, by the one of the one or more job execution apparatuses, the job. The job processing method further including: transmitting, by a first job transmitting unit of the information processing apparatus, the job and the first identification information to the job management apparatus; requesting, by a requesting unit of the information processing apparatus, state information, indicating a state of the job capable of being executed by any one of the one or more job execution apparatuses and associated with the first identification information transmitted to the job management apparatus, from the job management apparatus; receiving, by a state receiving unit of the information processing apparatus, state information, indicating a first stage in which the job is accumulated in the job management apparatus and a second stage in which the job acquired from the job management apparatus is executed by any one of the one or more job execution apparatuses as the state information of the job associated with the first identification information, from the job management apparatus; receiving, by a job receiving unit of the job management apparatus, the job and the first identification information from the information processing apparatus; storing and accumulating, by a job storage unit of the job management apparatus, the job and the first identification information received by the job receiving unit in a storage unit in a manner associated with each other; registering and storing therein, by a state information storage unit of the job management apparatus, state information of the job accumulated by the job storage unit in the first stage; receiving, by an identification information receiving unit of the job management apparatus, second identification information from one of the one or more job execution apparatuses; transmitting, by a second job transmitting unit of the job management apparatus, the job to the one of the one or more job execution apparatuses, the job being stored by the job storage unit and associated with the first identification information specified by the second identification information, the state information of the job being at the first stage; updating, by an updating unit of the job management apparatus, when the job transmitted by the second job transmitting unit is executed by the one of the one or more job execution apparatus that is a transmission destination, the state information at the first stage with the state information at the second stage; receiving, by a receiving unit of the job management apparatus, a request from the requesting unit of the information processing apparatus; and transmitting, by a state transmitting unit of the job management apparatus, the state information, specified by the request received by the receiving unit and associated with the first identification information, to the information processing apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a schematic of a table structure of a job history storage unit according to the first embodiment;

FIG. 14 is a schematic of an example in which state information of jobs is retained in an XML file format in the first embodiment;

FIG. 15 is an exemplary screen of a list of jobs output by the state control unit when no filtering is performed (mixing) in the first embodiment;

FIG. 16 is an exemplary screen of a list of jobs output by the state control unit when the job states are filtered by errors in the first embodiment;

FIG. 17 is an exemplary screen of a list of jobs output by the state control unit when the job states are filtered by completion in the first embodiment;

FIG. 18 is a schematic of an example in which the state control unit according to the first embodiment outputs state information of a job by e-mail;

FIG. 30 is a schematic of a first example of a job list screen displayed by the state control unit according to the third embodiment;

FIG. 33 is a schematic of a table structure of a job ID association storage unit according to the third embodiment;

FIG. 34 is a schematic of a table structure of a preview management table according to the third embodiment;

FIG. 35 is a schematic of a table structure of a processed job history storage unit according to the third embodiment;

DETAILED DESCRIPTION OF THE PREFERRED EMBODIMENTS

Embodiments of an information processing apparatus, a job processing system, and a job processing method according to the present invention are described below in greater detail with reference to the accompanying drawings.

First Embodiment

Figure 1:
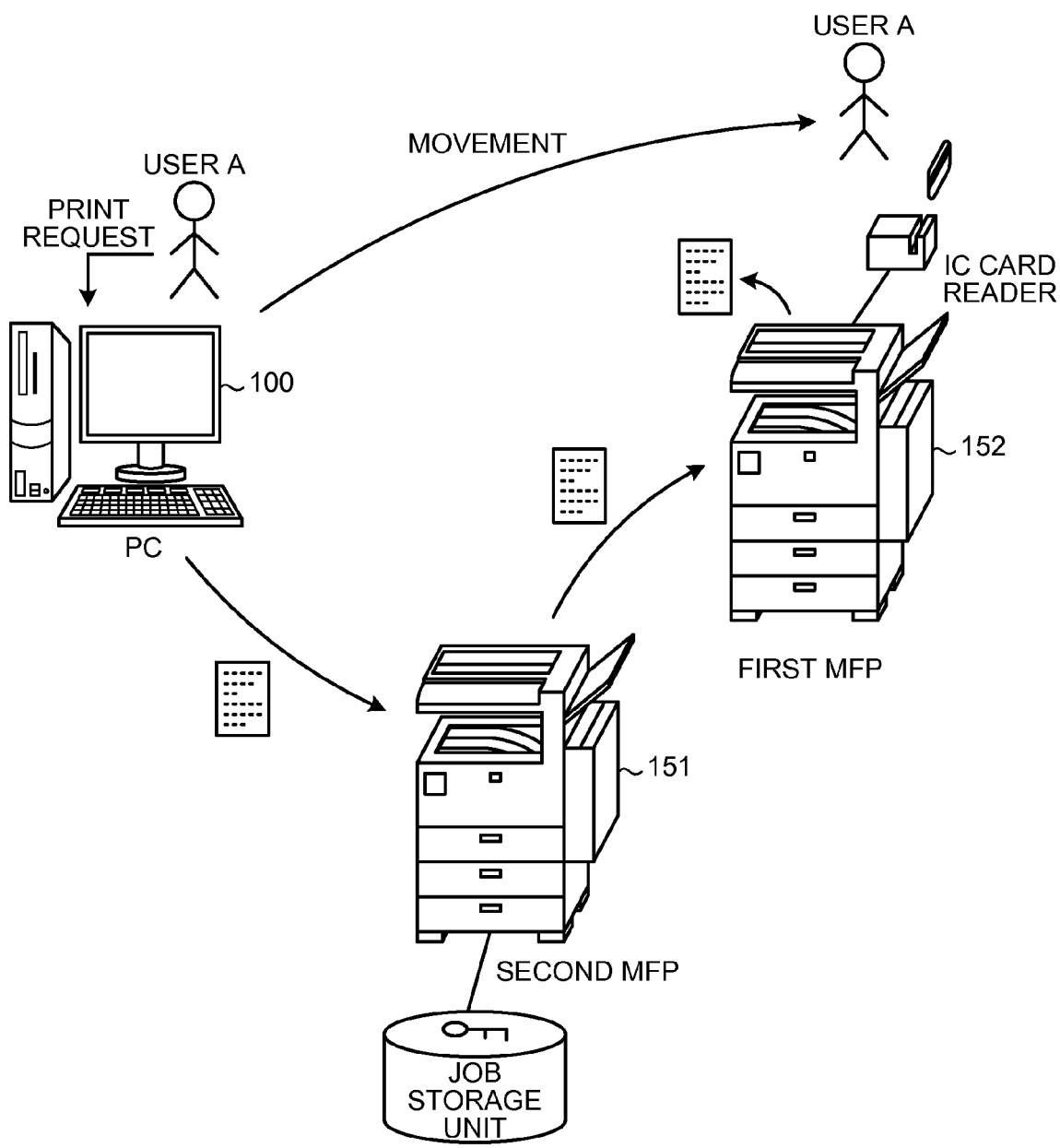
FIG. 1 is a schematic of a configuration of a print processing system according to a first embodiment.

FIG. 1 is a schematic of a configuration of a print processing system according to a first embodiment. As illustrated in FIG. 1, the print processing system according to the present embodiment includes a personal computer (PC) 100, a first multifunction peripheral (MFP) 152, and a second MFP 151.

In the example illustrated in FIG. 1, the PC 100 outputs a print job to request the first MFP 152 to perform printing of the print job. In this case, the print job output from the PC 100 is stored in a job storage unit of the second MFP 151 before being transmitted to the first MFP 152. Subsequently, if a user performs authentication with an IC card reader from the first MFP 152, the user can check for a list of print jobs for which printing is requested by the user.

If the user selects a print job desired to be printed from the list of print jobs, the first MFP 152 receives the print job thus selected from the second MFP 151 to perform print processing.

In the conventional technology, when a print job is transmitted from a PC and is accumulated in a second MFP, processing of the print job is considered to be completed. As a result, the user cannot view a state of the print job after accumulated from the PC 100.

By contrast, in the present embodiment, transmitting and receiving various types of data between the PC 100 and the MFPs 151 and 152 enables the user to refer to the state of a print job at the PC 100.

Figure 2:
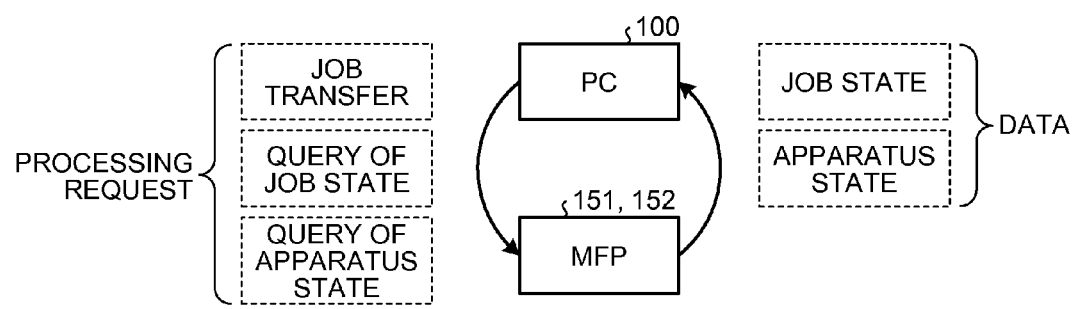
FIG. 2 is a schematic of a processing request and data transmitted and received between a PC and a plurality of MFPs according to the first embodiment.

FIG. 2 is a schematic of a processing request and data transmitted and received between the PC 100 and the MFPs 151 and 152 according to the first embodiment. As illustrated in FIG. 2, the PC 100 transmits job transfer, a query of a state of a job, and a query of a state of an apparatus to the MFPs 151 and 152.

The MFPs 151 and 152 transmit the state of the job and the state of the apparatus to the PC 100 in response to these queries. To perform this transmission and reception, the PC 100 needs to be authenticated by the MFPs 151 and 152. Therefore, to acquire these pieces of information, the PC 100 transmits authentication information to the MFPs 151 and 152.

The authentication information includes information to identify a transmission source to be authenticated. The information to identify the transmission source may be information to identify a user of the transmission source or a communication device that is the transmission source. The information to identify the transmission source may include a user ID and a password, an IP address or a MAC address identifying the PC 100, for example. In the present embodiment, to realize authentication, bibliographic information of a job transferred includes a job ID and authentication information.

Figure 3:
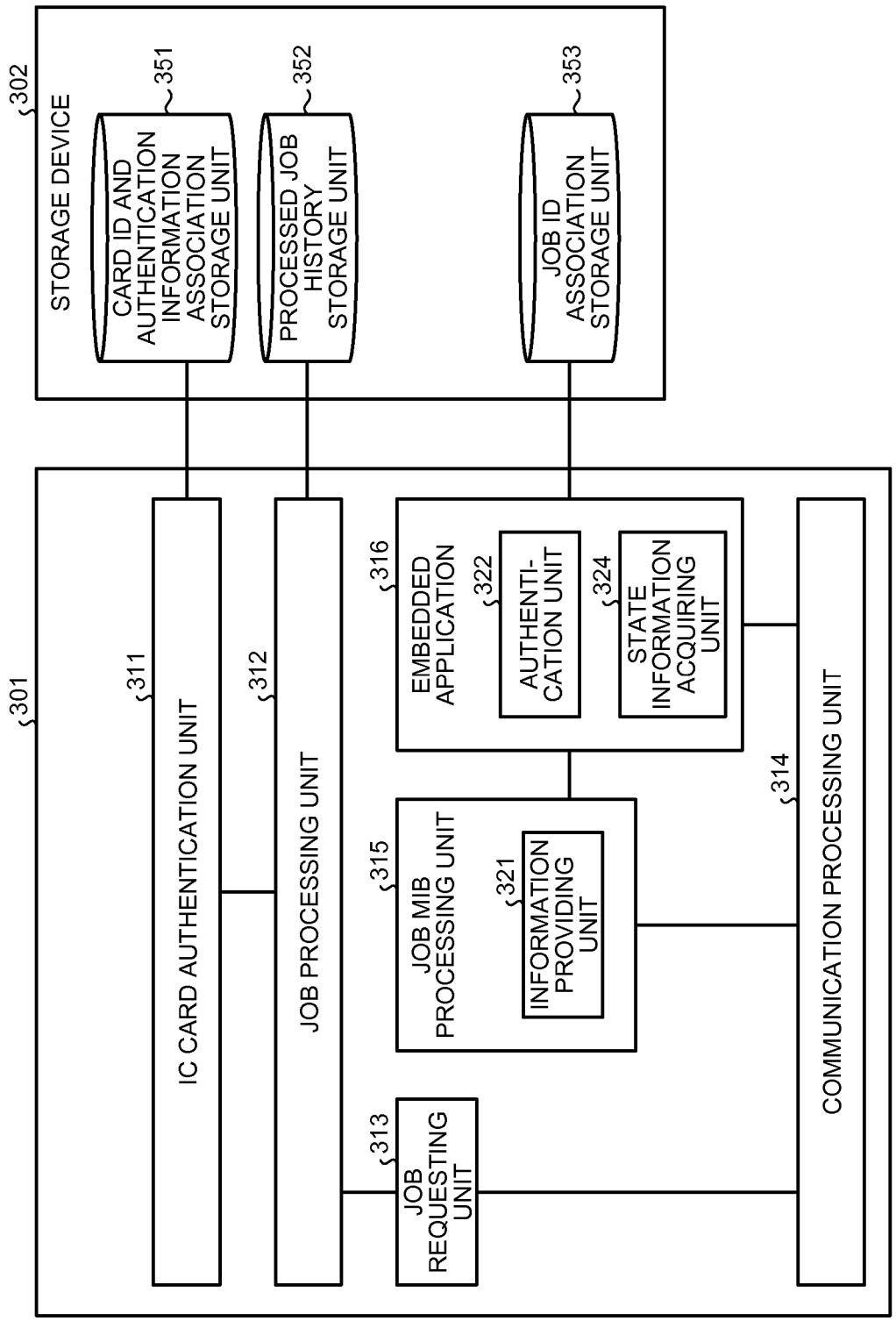
FIG. 3 is a block diagram of a software configuration of a first MFP according to the first embodiment.

FIG. 3 is a block diagram showing a software configuration of the first MFP 152 according to the first embodiment. As illustrated in FIG. 3, the first MFP 152 includes a storage device 302. The storage device 302 includes a card ID and authentication information association storage unit 351, a processed job history storage unit 352, and a job ID association storage unit 353. The first MFP 152 further includes an IC card authentication unit 311, a job processing unit 312, a job requesting unit 313, a communication processing unit 314, a job MIB processing unit 315, and an embedded application 316 as a software configuration 301.

The card ID and authentication information association storage unit 351 manages a card ID identifying a card used by a user to perform printing in the first MFP 152 and authentication information used for authentication of a job in a manner associated with each other.

Figures 4, 5, 6, 7:
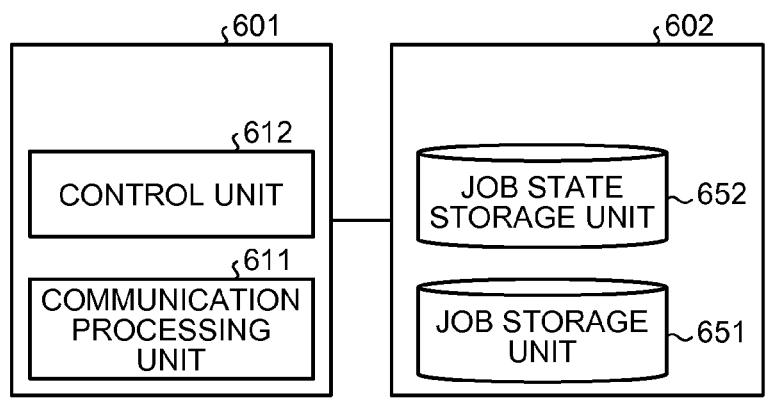
FIG. 4 is a schematic of a table structure of a processed job history storage unit according to the first embodiment.
FIG. 5 is a schematic of a table structure of a job ID association storage unit according to the first embodiment.
FIG. 6 is a schematic of a software configuration of an MFP according to the first embodiment.
FIG. 7 is a schematic of a table structure of a job state storage unit according to the first embodiment.

The processed job history storage unit 352 stores therein a job ID identifying a job processed by the job processing unit 312. FIG. 4 is a schematic of a table structure of the processed job history storage unit 352 according to the first embodiment. As illustrated in FIG. 4, the processed job history storage unit 352 stores therein a job ID identifying a job for which printing has been performed.

The job ID association storage unit 353 stores therein a job ID identifying a job and authentication information used for authentication of the job in a manner associated with each other. FIG. 5 is a schematic of a table structure of the job ID association storage unit 353 according to the first embodiment. As illustrated in FIG. 5, the job ID association storage unit 353 stores therein a job ID and authentication information in a manner associated with each other.

The communication processing unit 314 transmits and receives data to and from other apparatuses such as the PC 100 and the second MFP 151.

The IC card authentication unit 311 performs authentication based on a card ID input from a card reader (not illustrated). In the present embodiment, the IC card authentication unit 311 performs authentication by referring to the card ID and authentication information association storage unit 351. If the authentication is performed properly, the IC card authentication unit 311 acquires authentication information associated with the card ID thus input in the card ID and authentication information association storage unit 351.

The job processing unit 312 executes a job. The job processing unit 312 according to the present embodiment acquires a job ID associated with the authentication information thus acquired in the job ID association storage unit 353, and displays a list of job IDs on a display device, which is not illustrated. In the present embodiment, a job ID is identified based on the authentication information in accordance with the correspondence relationship in the job ID association storage unit 353. A method of identifying a job ID is not limited to the correspondence relationship, and any method can be employed as long as a job ID can be identified based on the authentication information.

When receiving selection of a job ID from the list of job IDs, the job requesting unit 313 issues an acquisition request of a job identified by the job ID, the selection of which is received, to the second MFP 151. The acquisition request is transmitted via the communication processing unit 314.

In accordance with the acquisition request from the job requesting unit 313, the communication processing unit 314 receives the job from the second MFP 151. The job processing unit 312 then executes the job thus received. Subsequently, the job processing unit 312 registers the job ID identifying the job thus executed in the processed job history storage unit 352.

The embedded application 316 includes an authentication unit 322 and a state information acquiring unit 324, and enables providing a state of a job to the PC 100.

Every time a job is accumulated in the second MFP 151, the communication processing unit 314 receives a job ID identifying the job and authentication information received along with the job from the PC 100. The embedded application 316 then stores the job ID and the authentication information thus received in the job ID association storage unit 353 in a manner associated with each other. This enables the first MFP 152 to perform authentication for each job.

The authentication unit 322 authenticates whether a state of a job should be allowed to be transmitted to an apparatus.

The communication processing unit 314, for example, receives query information to inquire whether authentication of a transmission source of a job based on authentication information is to be performed from the PC 100. In response to the query information, the authentication unit 322 transmits information indicating that the authentication is to be performed via the communication processing unit 314 to the PC 100.

When the communication processing unit 314 receives a job ID and authentication information from the PC 100, the authentication unit 322 performs authentication based on whether the authentication information and the job ID thus received are associated with each other in the job ID association storage unit 353. In the present embodiment, if the authentication information and the job ID are associated with each other, the authentication unit 322 recognizes that authentication is performed properly.

If the authentication is performed properly, the state information acquiring unit 324 searches the processed job history storage unit 352 using the job ID received from the PC 100 as a search key. If the job ID is registered, it is possible to recognize that a state of the job identified by the job ID is a stage of processed. By contrast, if the job ID is not registered, the state information acquiring unit 324 transmits the job ID to the second MFP 151 via the communication processing unit 314.

If the second MFP 151 stores therein the job identified by the job ID thus received, the second MFP 151 transmits state information indicating a state of the job to the first MFP 152. Thus, the state information acquiring unit 324 acquires the state information via the communication processing unit 314.

The job MIB processing unit 315 includes an information providing unit 321, and provides information indicating a state of an apparatus (e.g., the second MFP 151) and information indicating a state of a job retained by an apparatus to another apparatus.

If proper authentication is performed, the information providing unit 321 transmits the state of the job acquired by the state information acquiring unit 324 to the PC 100. Furthermore, the information providing unit 321 provides the state of the first MFP 152 or the state of the second MFP 151 to the PC 100.

The second MFP 151 will now be explained. FIG. 6 is a schematic showing a software configuration of the second MFP 151. As illustrated in FIG. 6, the second MFP 151 includes a communication processing unit 611 and a control unit 612 as a software configuration 601. Furthermore, the second MFP 151 includes a storage device 602. The second MFP 151 does not transmit or receive information related to a state of a job to or from the PC 100. The second MFP 151 functions as a receiving apparatus that receives a job from the PC 100.

The storage device 602 includes a job storage unit 651 and a job state storage unit 652. The job storage unit 651 stores therein a job.

The job state storage unit 652 stores therein a job ID identifying a job and a state of the job in a manner associated with each other. FIG. 7 is a schematic of a table structure of the job state storage unit 652. As illustrated in FIG. 7, the job state storage unit 652 stores therein a state of each job, such as "accumulated" and "being received", so as to associate the state with the each job.

The communication processing unit 611 transmits and receives data to and from the first MFP 152 or the PC 100. The communication processing unit 611, for example, receives a job, a job ID identifying the job, and authentication information required for authentication of the job from the PC 100. Furthermore, the communication processing unit 611 transmits the job ID and the authentication information thus received to the first MFP 152. Thus, the second MFP 151 can recognize the job thus received.

The second MFP 151 then stores therein the job, and transfers the job to the first MFP 152 when a request is received from the first MFP 152.

The control unit 612 adds, updates, and deletes a record of the job state storage unit 652 in accordance with a state of a job. If the communication processing unit 611 starts receiving a job, for example, the control unit 612 registers a job ID identifying the job and a state of the job of "being received" in the job state storage unit 652. If reception of the job is finished, the control unit 612 updates the state of the job to "accumulated". In this way, the control unit 612 performs update in accordance with the state of the job.

Figure 8:
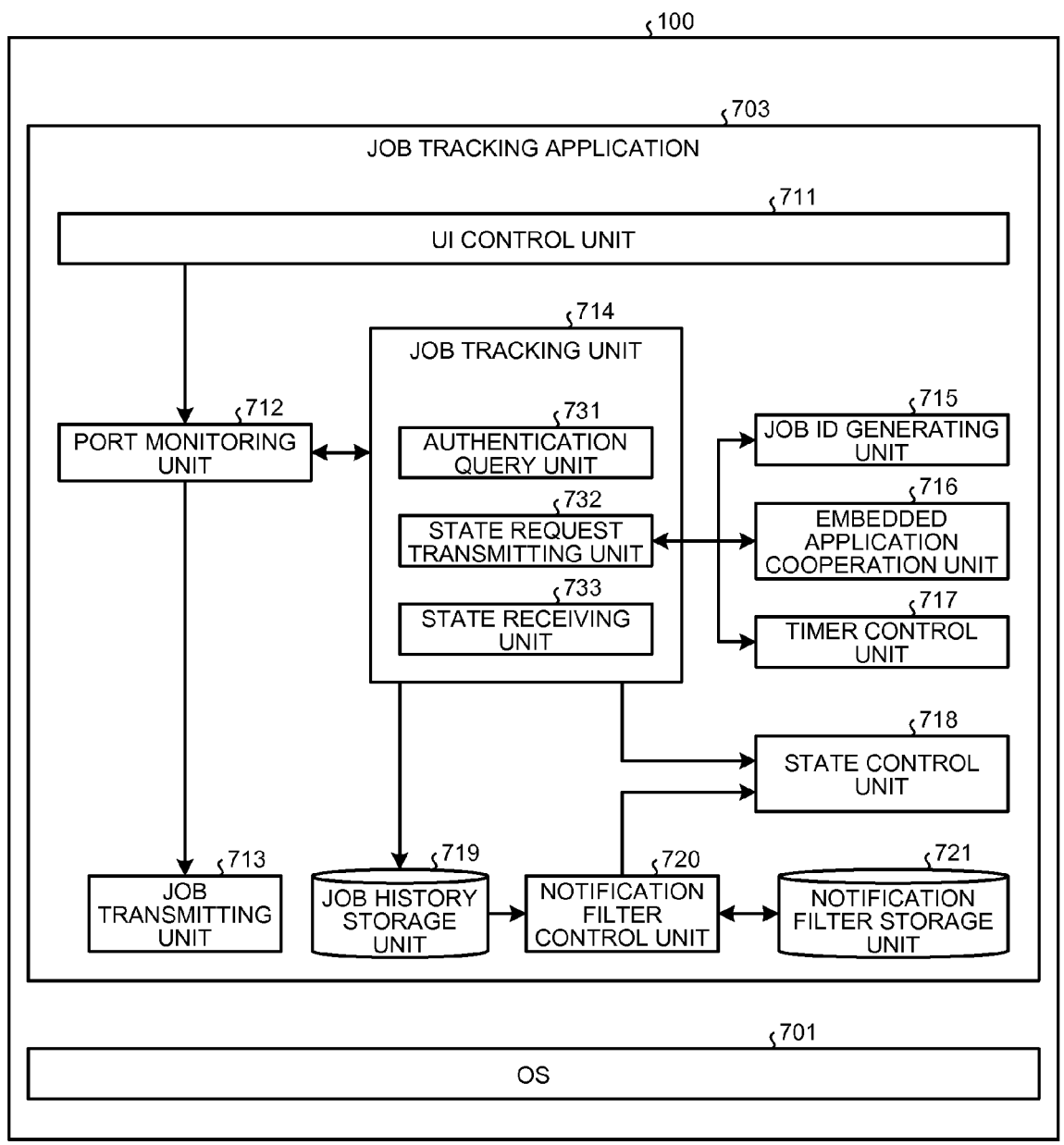
FIG. 8 is a block diagram of a software configuration of the PC according to the first embodiment.

FIG. 8 is a block diagram of a software configuration of the PC 100 according to the first embodiment. As illustrated in FIG. 8, the PC 100 includes an operating system (OS) 701 and a job tracking application 703.

The OS 701 is software that manages resource of the PC 100 and that includes an interface to provide the resource to another application.

In the present embodiment, an example where a print job is transferred is explained. However, a job to be transferred is not limited to a print job, and may be a job to send a FAX.

The job tracking application 703 includes a user interface (UI) control unit 711, a port monitoring unit 712, a job transmitting unit 713, a job tracking unit 714, a job ID generating unit 715, an embedded application cooperation unit 716, a timer control unit 717, a state control unit 718, a job history storage unit 719, a notification filter control unit 720, and a notification filter storage unit 721.

The UI control unit 711 controls a UI provided for a user.

The job ID generating unit 715 generates a unique ID for each print job. The job ID thus generated is transferred to the port monitoring unit 712 via the job tracking unit 714.

The port monitoring unit 712 intermediates between printing or a FAX service that is operating on the PC 100 and the MFPs 151 and 152, and controls a print job.

If the UI control unit 711 receives an operation to instruct output of a print job to the first MFP 152, the port monitoring unit 712 according to the present embodiment outputs the print job to the second MFP 151. If the first MFP 152 accepts authentication with an IC card, the job accumulated in the second MFP 151 is transferred to the first MFP 152.

In accordance with control of the port monitoring unit 712, the job transmitting unit 713 transmits a job of printing or sending a FAX of image information, a job ID identifying the job, and authentication information to the second MFP 151.

The embedded application cooperation unit 716 functions as an interface to cooperate with the embedded application 316 and the job MIB processing unit 315 of the first MFP 152. During cooperation, encryption may be performed for a communication line.

The job tracking unit 714 includes an authentication query unit 731, a state request transmitting unit 732, and a state receiving unit 733, and tracks a job transmitted by the job transmitting unit 713.

The authentication query unit 731 transmits query information to inquire whether authentication of a transmission source of a job based on authentication information is to be performed to the first MFP 152 that processes the job received by the second MFP 151. This transmission is performed via the embedded application cooperation unit 716.

The authentication query unit 731 then receives a response (information indicating whether the authentication is performed) to the query information from the first MFP 152 via the embedded application cooperation unit 716.

If information indicating that the authentication is to be performed is received from the first MFP 152, the state request transmitting unit 732 transmits a job ID identifying a job, a state of which is desired to be grasped, and authentication information along with an authentication request to the first MFP 152. This transmission is performed via the embedded application cooperation unit 716.

After the state request transmitting unit 732 transmits the job ID and the authentication information and the first MFP 152 performs the authentication, the state receiving unit 733 receives state information indicating a state of a job transmitted from the PC 100 and identified by the job ID from the first MFP 152 via the embedded application cooperation unit 716.

The state receiving unit 733 according to the present embodiment receives state information indicating at least one of a stage in which a job is accumulated in the second MFP 151 and a stage in which a job acquired from the second MFP 151 is executed by the first MFP 152 as the state information of the job associated with the job ID.

The state control unit 718 outputs the state information received by the state receiving unit 733. The state control unit 718 according to the present embodiment outputs the state information to display the state information on a display device, which is not illustrated. As a result, the state of the job is displayed as a pop-up.

Figure 9:
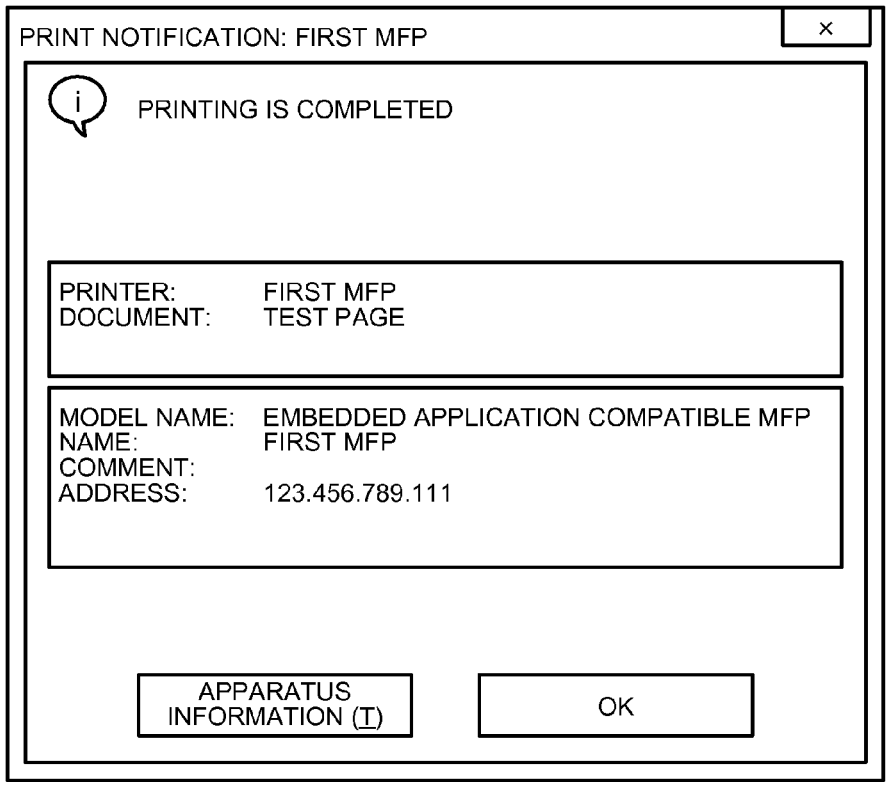
FIG. 9 is a schematic of an example of a pop-up screen displayed by a state control unit when printing of a print job is completed in the first embodiment.

FIG. 9 is a schematic of an example of a pop-up screen displayed by the state control unit 718 when printing of a print job is completed in the first embodiment. The pop-up screen illustrated in FIG. 9 is displayed when printing of the job is completed by the first MFP 152 and a job ID identifying the job is stored in the processed job history storage unit 352.

Figure 10:
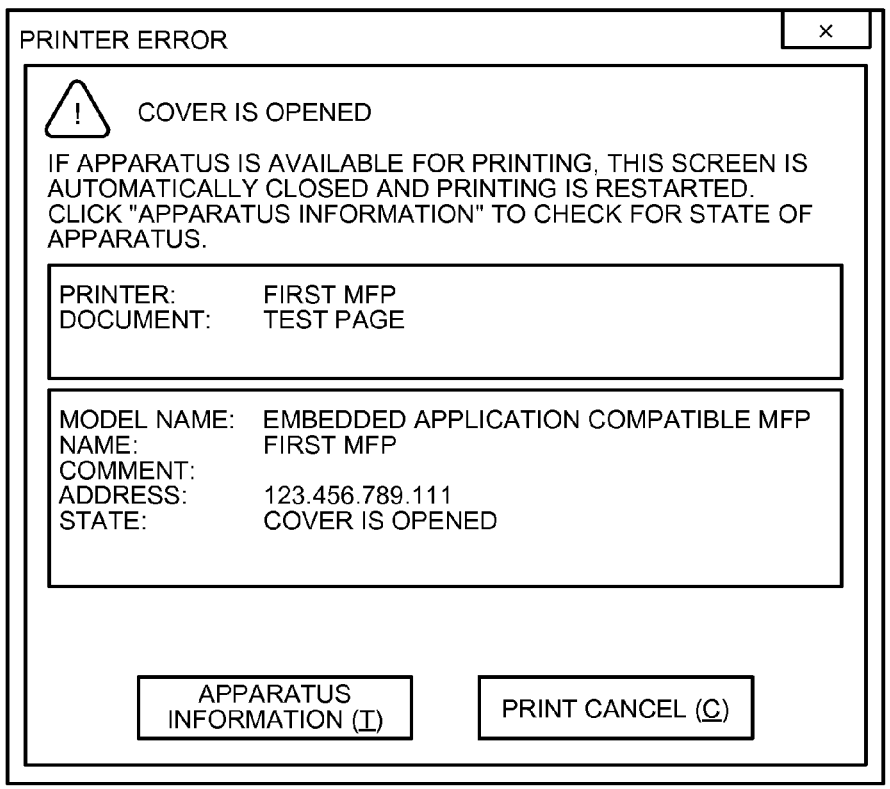
FIG. 10 is a schematic of an example of a pop-up screen displayed by the state control unit when a cover of the first MFP is opened in the first embodiment.

FIG. 10 is a schematic of an example of a pop-up screen displayed by the state control unit 718 when a cover of the first MFP 152 is opened in the first embodiment. The pop-up screen illustrated in FIG. 10 is displayed when the cover of the first MFP 152 is opened and the job whose state is requested to be acquired cannot be executed. When the job cannot be executed in this manner, the state receiving unit 733 receives a state of an apparatus that prevents the job from being executed.

In the present embodiment, display is not limited to such a pop-up screen. Alternatively, display may be performed using a balloon near a task bar on a display screen.

Figure 11:
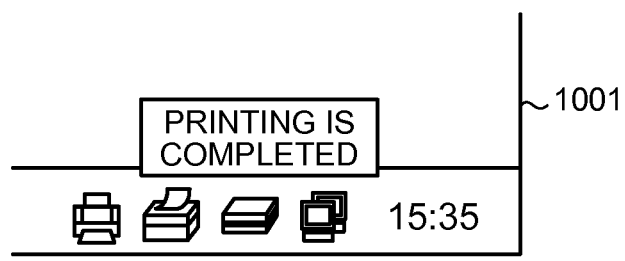
FIG. 11 is a schematic of an example of a pop-up balloon displayed by the state control unit when a print job is completed in the first embodiment.

FIG. 11 is a schematic showing an example of a balloon 1001 displayed by the state control unit 718 when a print job is completed in the first embodiment. Display of the balloon 1001 enables the user to find that the print job is completed.

Figure 12:
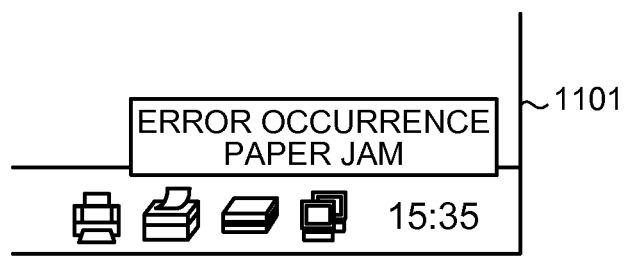
FIG. 12 is a schematic of an example of a pop-up balloon displayed by the state control unit when a print job fails to be processed because of a paper jam in the first embodiment.

FIG. 12 is a schematic showing an example of a pop-up balloon 1101 displayed by the state control unit 718 when a print job cannot be processed because of a paper jam in the first embodiment. Display of the balloon 1101 enables the user to find that the printing is not completed yet because of the paper jam.

If the state receiving unit 733 receives state information indicating that the job is not normally completed yet as the state information of the job in this manner, the state control unit 718 displays the fact that an error occurs in the first MFP 152. As a result, the user can rapidly perform an operation to eliminate the error.

The job history storage unit 719 stores therein state information of a job received by the state receiving unit 733 as a history. FIG. 13 is a schematic showing a table structure of the job history storage unit 719 according to the present embodiment. As illustrated in FIG. 13, the job history storage unit 719 stores therein a job ID, a start time, a job state, a name of an output apparatus, an apparatus state, and a name of a document in a manner associated with one another. The name of a document means a name of a document that is a target to be printed in the job.

A method of retaining the state information employed by the job history storage unit 719 is not limited to the table structure. Alternatively, the job history storage unit 719 may retain the state information as an Extensible Markup Language (XML) file, for example. FIG. 14 is a schematic of an example in which the state information of the jobs is retained in an XML file format.

The timer control unit 717 measures elapsed time. After a predetermined time has elapsed based on measurement performed by the timer control unit 717 from a time when the state receiving unit 733 receives state information of a job, the state control unit 718 stops outputting a screen that displays the state of the job. This makes it possible to ensure security. A time at which the state information of the job is received is retained in the job history storage unit 719 as start information.

The notification filter storage unit 721 stores therein filtering conditions used for filtering processing performed by the notification filter control unit 720.

Specific examples of the conditions stored in the notification filter storage unit 721 include no filtering (a jumble), a condition to sort print jobs based on whether completed or whether an error occurs, a condition to sort print jobs for each of apparatuses that process the print jobs, a condition to divide print jobs in units of a specified number, and a condition to divide print jobs into groups each consisting of print jobs each associated with a time within a period that is common to the print jobs consisting the same group and has a predetermined length (e.g., one hour).

In accordance with an operation performed by a user, the state control unit 718 outputs (displays) information on jobs stored in the job history storage unit 719. At this time, the information output includes the state information of the jobs. When the state control unit 718 outputs the information, the notification filter control unit 720 performs filtering processing on the state information of the jobs stored in the job history storage unit 719 using conditions stored in the notification filter storage unit 721.

FIG. 15 is an exemplary screen of a list of jobs output by the state control unit 718 in a case of no filtering (a jumble). FIG. 16 is an exemplary screen of a list of jobs output by the state control unit 718 when the job states are subjected to the filtering processing based on whether an error occurs. FIG. 17 is an exemplary screen of a list of jobs output by the state control unit 718 when the job states are subjected to the filtering processing based on whether completed.

As illustrated in FIG. 15 to FIG. 17, a list of jobs can be displayed in accordance with the conditions set for the filtering processing. This facilitates finding each job by a user.

In the present embodiment, a destination of information output from the state control unit 718 is not limited to the display device. Alternatively, the state control unit 718 may output information in any manner as long as a user can recognize the information.

FIG. 18 is a schematic showing an example in which the state control unit 718 outputs state information of a job by e-mail. As illustrated in FIG. 18, the state control unit 718 transmits an e-mail with state information of a job written in a text, thereby enabling the user to recognize the state of the job.

In the present embodiment, with the job tracking application 703 incorporated into the PC 100 as a virtual printer driver, a user is enabled to accumulate a job by simply selecting the virtual printer driver from a document creation application. Furthermore, referring to properties of the virtual printer driver enables a user to check for a state of a job processed using the virtual printer driver.

Figure 19:
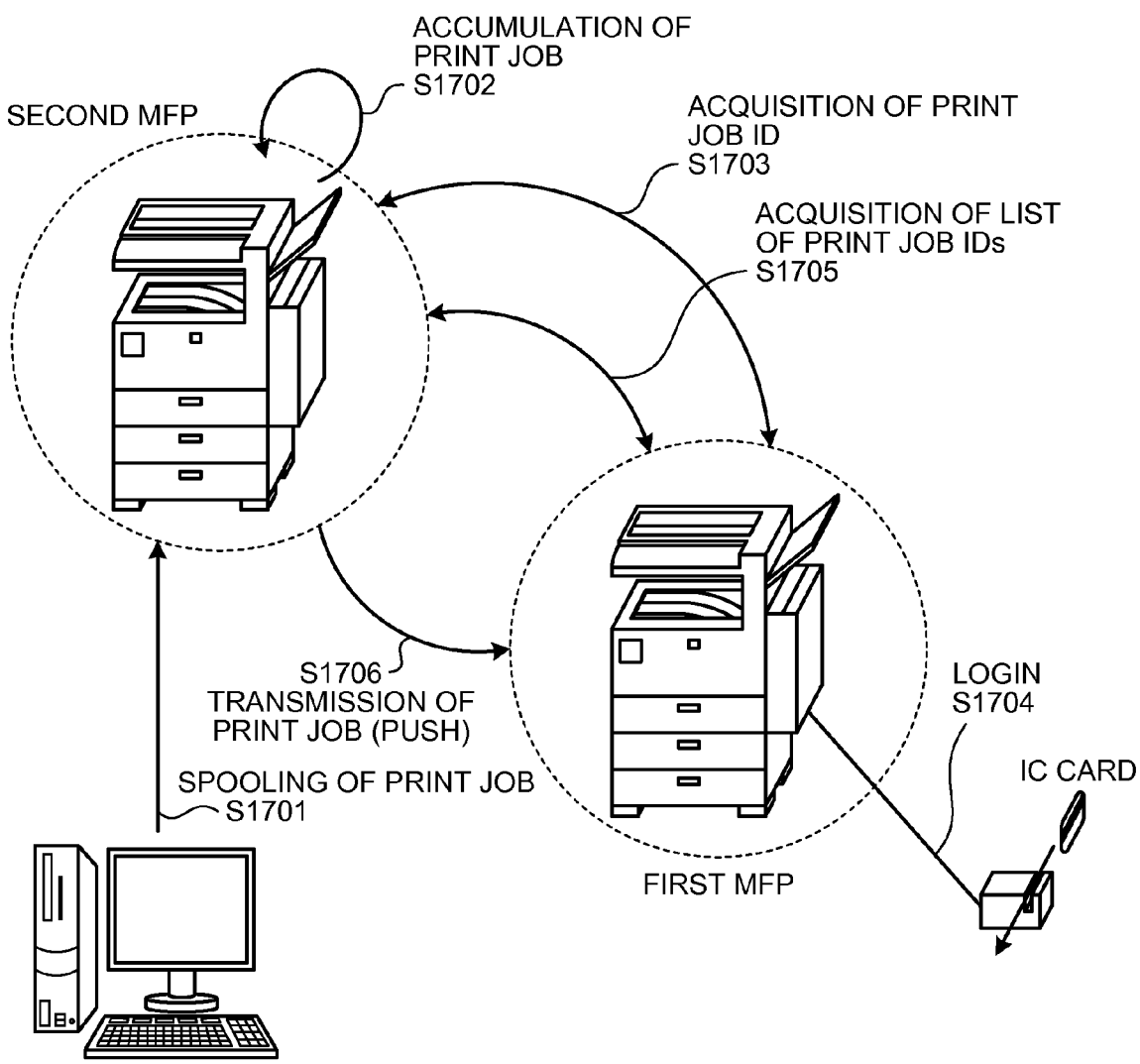
FIG. 19 is a schematic of a process in which a print job is input by the PC and is output by the first MFP according to the first embodiment.

Processing started from the PC 100 and until a time when the first MFP 152 performs output will now be described. FIG. 19 is a schematic showing processing started from the PC 100 and until a time when the first MFP 152 performs output.

When transmitting a print job to the second MFP 151, the PC 100 performs spooling of the print job (Step S1701). The second MFP 151 then accumulates therein the print job (Step S1702).

The second MFP 151 transmits a print job ID identifying the print job thus accumulated to the first MFP 152. As a result, the first MFP 152 acquires the print job ID (Step S1703). At this time, the first MFP 152 acquires authentication information along with the print job ID.

Subsequently, the IC card authentication unit 311 of the first MFP 152 accepts login of a user using an IC card (Step S1704). The IC card authentication unit 311 of the first MFP 152 reads authentication information corresponding to an ID card number from the card ID and authentication information association storage unit 351. The job processing unit 312 specifies a print job ID associated with the authentication information from the job ID association storage unit 353. The job processing unit 312 then acquires information of a list of print job IDs thus specified from the second MFP 151 (Step S1705).

Subsequently, the job processing unit 312 displays a list of jobs including state information. When receiving selection of a job from the user, the job processing unit 312 receives the print job thus selected from the second MFP 151 (Step S1706) to perform print processing.

With the processing described above, transmission and reception of data among the first MFP 152, the second MFP 151, and the PC 100 enable print processing of the print job.

Figure 20:
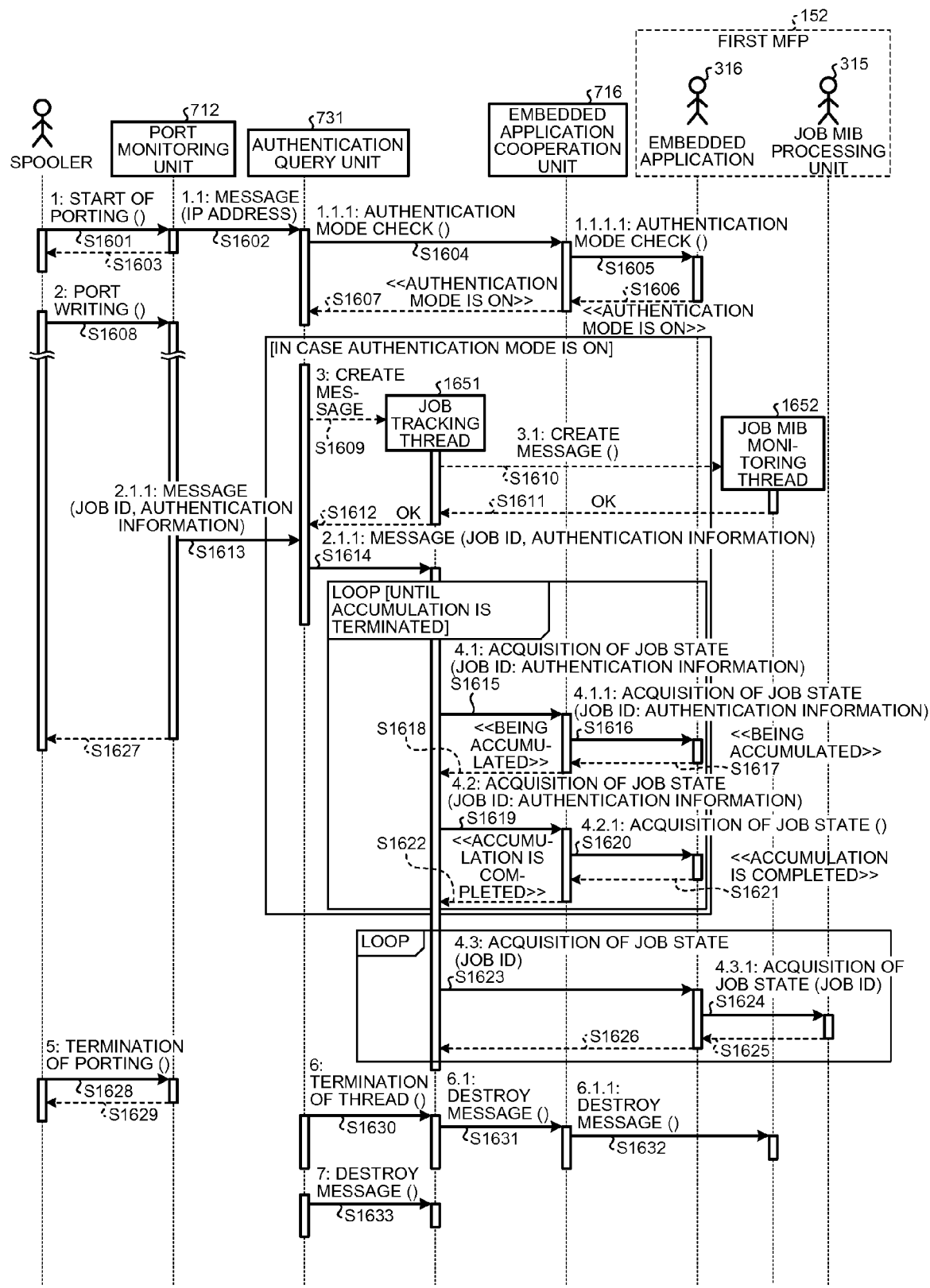
FIG. 20 is a sequence diagram of a process of processing for acquiring state information of a job in the PC according to the first embodiment.

Processing during acquiring state information of a job performed by the PC 100 according to the present embodiment will now be described. FIG. 20 is a flowchart of a process of the processing described above in the PC 100 according to the present embodiment.

A spooler requests the port monitoring unit 712 to start porting (Step S1601). Thus, processing for printing of a print job is started.

In synchronization with the start of the processing for printing, processing to track the job is performed in parallel. For this reason, the port monitoring unit 712 transmits a message including an IP address of an acquisition source of state information of the job to the authentication query unit 731 (Step S1602). Subsequently, the port monitoring unit 712 notifies the spooler that transmission is performed (Step S1603).

The authentication query unit 731 then transmits query information (authentication mode check) to inquire whether authentication of a transmission source of the job using authentication information is to be performed via the embedded application cooperation unit 716 (Steps S1604 and S1605). When authentication is to be performed, the embedded application 316 of the first MFP 152 transmits information indicating that the authentication is to be performed (an authentication mode is ON) (Steps S1606 and S1607).

Subsequently, the spooler requests the port monitoring unit 712 to perform port writing (Step S1608). Thus, processing of transmitting the print job to the second MFP 151 by the job transmitting unit 713 is started, although not illustrated in FIG. 20.

On the other hand, the processing to track the print job is also proceeded. In the present embodiment, if information indicating that the authentication is to be performed is received, the authentication query unit 731 creates a job tracking thread 1651 by a Create message (Step S1609). The job tracking thread 1651 is created by deploying the state request transmitting unit 732 and the state receiving unit 733 of the job tracking unit 714 illustrated in FIG. 8 on a memory. The job tracking threads 1651, number of which is equal to number of jobs to be tracked, are created.

Subsequently, the job tracking thread 1651 creates a job MIB monitoring thread 1652 by a Create message (Step S1610). If the job MIB monitoring thread 1652 is created, the job MIB monitoring thread 1652 transmits information indicating that the job MIB monitoring thread 1652 is created (OK) to the job tracking thread 1651 (Step S1611).

The job tracking thread 1651 then transmits information indicating that processing is performed properly (OK) to the authentication query unit 731 (Step S1612).

Subsequently, the port monitoring unit 712 transfers a message including a job ID and authentication information to the authentication query unit 731 (Step S1613). The authentication query unit 731 then transfers the message including the job ID and the authentication information to the job tracking thread 1651 (Step S1614).

As a result, the state request transmitting unit 732 of the job tracking thread 1651 transmits an acquisition request of state information of the job along with the job ID and the authentication information to the embedded application 316 of the first MFP 152 via the embedded application cooperation unit 716 (Steps S1615 and S1616).

The embedded application 316 then transmits the state information (e.g., indicating that accumulation is being performed) of the job identified by the job ID thus received along with the acquisition request to the job tracking thread 1651 (Steps S1617 and S1618).

The processing from Steps S1615 to S1618 is repeated until the state information of the print job changes to indicate that accumulation is completed, for example (Steps S1619 to S1622).

The state request transmitting unit 732 of the job tracking thread 1651 then transmits the acquisition request of the state information of the job to the job MIB processing unit 315 of the first MFP 152 using the job ID as an argument (Steps S1623 and S1624).

As a result, the state receiving unit 733 of the job tracking thread 1651 receives the state information of the job from the job MIB processing unit 315 (Steps S1625 and S1626).

On the other hand, when the job transmitting unit 713 finishes transmission of the job, the port monitoring unit 712 transmits information indicating it to the spooler (Step S1627).

Subsequently, the spooler transmits information indicating that the porting is finished to the port monitoring unit 712 (Step S1628). As a result, the port monitoring unit 712 transmits information indicating that the porting is finished to the spooler (Step S1629).

The authentication query unit 731 then requests a termination request of the job tracking thread 1651 (Step S1630). Subsequently, the job tracking thread 1651 transmits a Destroy message to the job MIB monitoring thread 1652 via the embedded application cooperation unit 716 (Steps S1631 and S1632). As a result, the job MIB monitoring thread 1652 is destroyed.

Subsequently, the authentication query unit 731 transmits a Destroy message to the job tracking thread 1651 (Step S1633). As a result, the job tracking thread 1651 is destroyed.

In accordance with the processing described above, the configuration described above enables the PC 100 to acquire state information of a print job. The state information of the print job thus acquired is accumulated in the job history storage unit 719. Thus, the PC 100 can display the state information on the display device or perform notification of the state information by e-mail.

Figure 21:
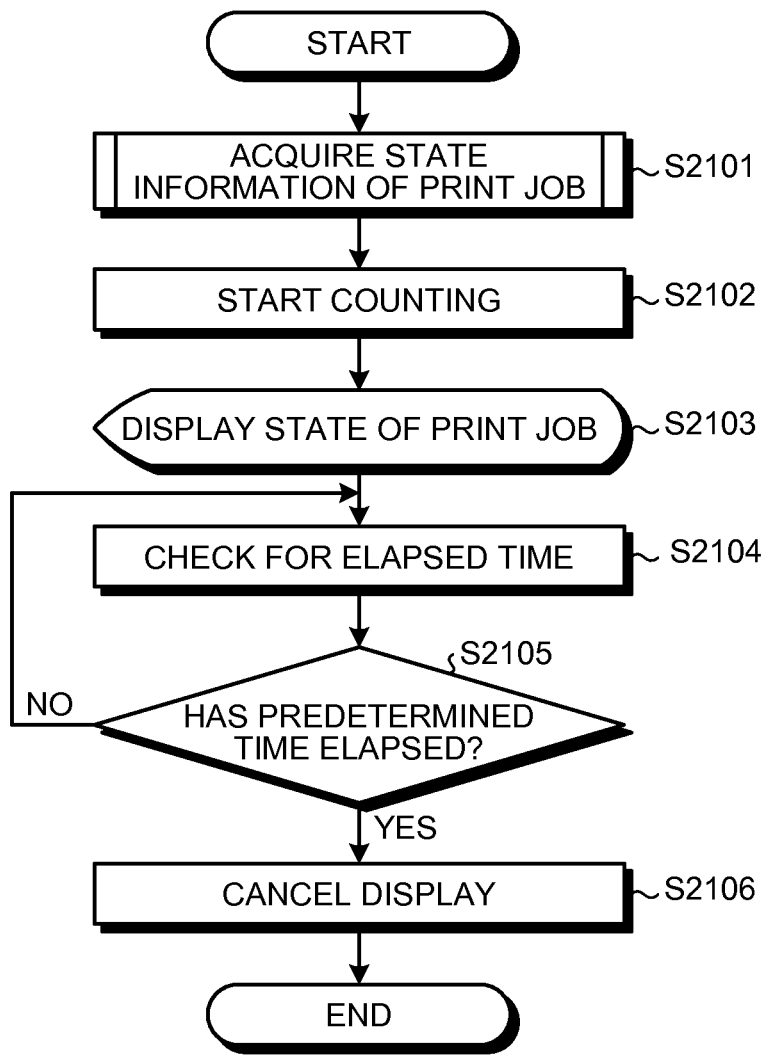
FIG. 21 is a flowchart of a display process of a print job performed by the state control unit according to the first embodiment.

Processing of displaying a print job performed by the state control unit 718 will now be described. FIG. 21 is a flowchart showing the processing of displaying a print job performed by the state control unit 718 according to the present embodiment.

The PC 100 acquires state information of a print job in accordance with the processing illustrated in FIG. 20 (Step S2101). The timer control unit 717 then starts counting triggered by this acquisition (Step S2102).

The state control unit 718 then displays the state of each print job on the display device based on the state information of the print job thus acquired (Step S2103).

Subsequently, the state control unit 718 checks for elapsed time since the timer control unit 717 started the counting (Step S2104). The state control unit 718 then determines whether a predetermined time has elapsed (Step S2105). If the state control unit 718 determines that the predetermined time has not elapsed yet (No at Step S2105), the processing is returned to Step S2104.

By contrast, if the state control unit 718 determines that the predetermined time has elapsed (Yes at Step S2105), the state control unit 718 terminates display of the state information of the print job acquired at Step S2101 (Step S2106).

In the present embodiment, by performing processing in accordance with the processing described above, it is possible to ensure security.

Figure 22:
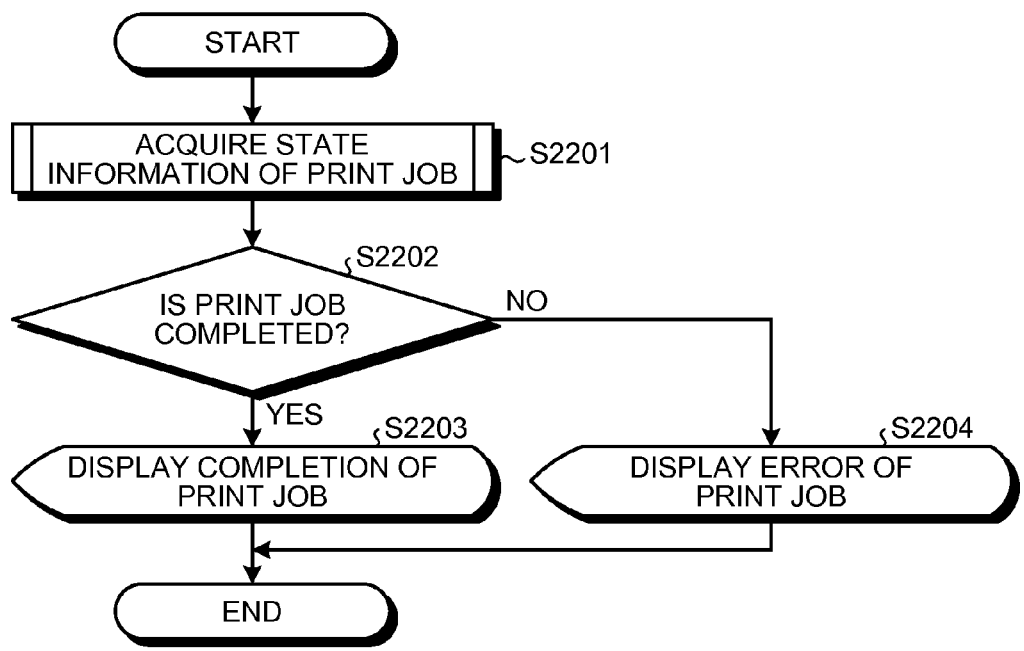
FIG. 22 is a flowchart of a display process using a notification filter performed by the state control unit according to the first embodiment.

A display process using a notification filter performed by the state control unit 718 will now be described. FIG. 22 is a flowchart of display processing using a notification filter performed by the state control unit 718.

The PC 100 acquires state information of a print job in accordance with the processing illustrated in FIG. 20 (Step S2201). The print job thus acquired is stored in the job history storage unit 719.

Subsequently, the notification filter control unit 720 performs filtering using a condition that a print job is completed and that is stored in the notification filter storage unit 721, thereby determining whether a completed print job is present, that is, whether the print job is completed (Step S2202). If the notification filter control unit 720 determines that the print job is completed (Yes at Step S2202), the state control unit 718 displays completion of the print job (Step S2203).

By contrast, if the notification filter control unit 720 determines that the print job is not completed yet (No at Step S2202), the state control unit 718 displays an error of the print job (Step S2204). The process described above enables the user to check for the state of the print job.

In the first embodiment, explanation has been made of for a case where information stored in association with a print job is a job ID. However, information associated with a print job is not limited to a job ID, and may be other identification information. A user ID identifying a user may be stored in association with a print job, for example. The same applies to embodiments described below.

Second Embodiment

In the first embodiment, an example in which a print job is accumulated in the second MFP has been explained. However, the present invention is not limited to an aspect illustrated in the first embodiment, and reception and accumulation of a print job and execution of the print job may be performed in a single apparatus.

Figure 23:
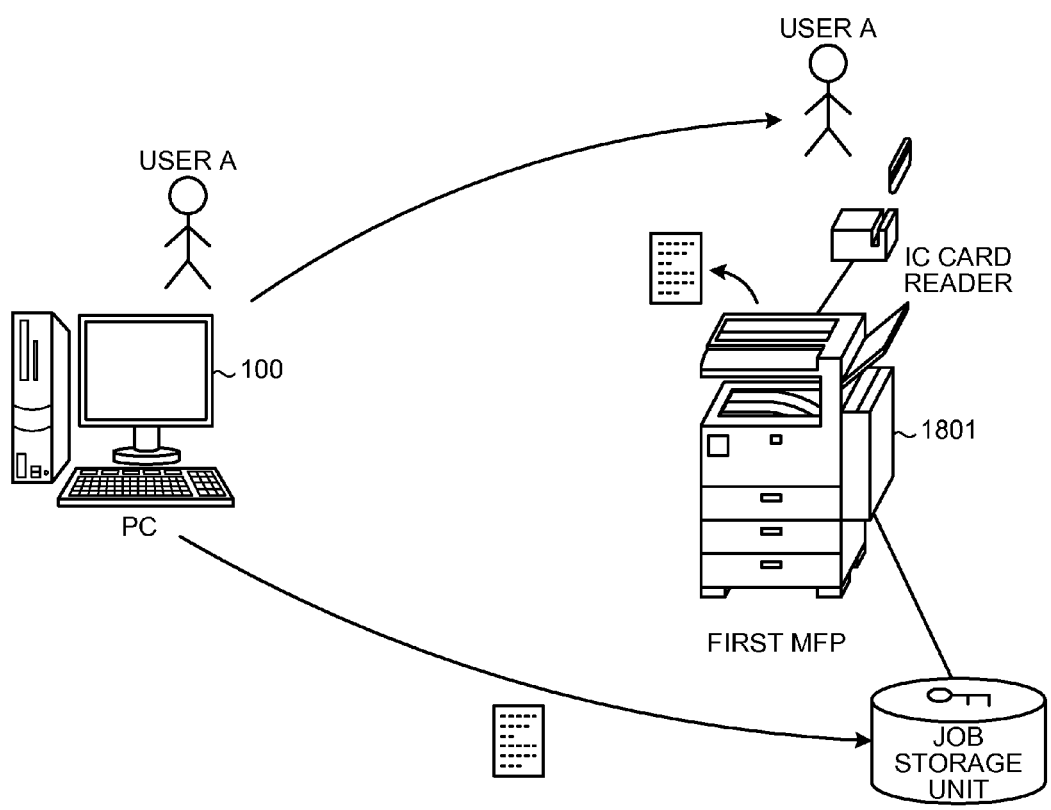
FIG. 23 is a schematic of a configuration of a print processing system according to a second embodiment.

FIG. 23 is a schematic of a configuration of a print processing system according to a second embodiment. As illustrated in FIG. 23, the print processing system according to the present embodiment includes a PC 100 and a first MFP 1801.

As illustrated in FIG. 23, if the PC 100 outputs a print job, printing of which is requested to be performed by the first MFP 1801, the print job is stored in a job storage unit of the first MFP 1801. Subsequently, if the user performs authentication with an IC card reader at the first MFP 1801, the user can check for a list of print jobs, printing of which is requested by the user.

If the user selects a print job desired to be printed from the list of print jobs, the first MFP 1801 reads the print job accumulated in the first MFP 1801 itself to perform print processing.

A configuration of the first MFP 1801 according to the present embodiment is obtained by combining the configuration illustrated in FIG. 3 and the configuration illustrated in FIG. 6, and the explanation thereof will be omitted. Furthermore, processing performed by the first MFP 1801 is processing obtained by combining the processing performed by the first MFP 152 and the processing performed by the second MFP 151 according to the first embodiment.

Figure 24:
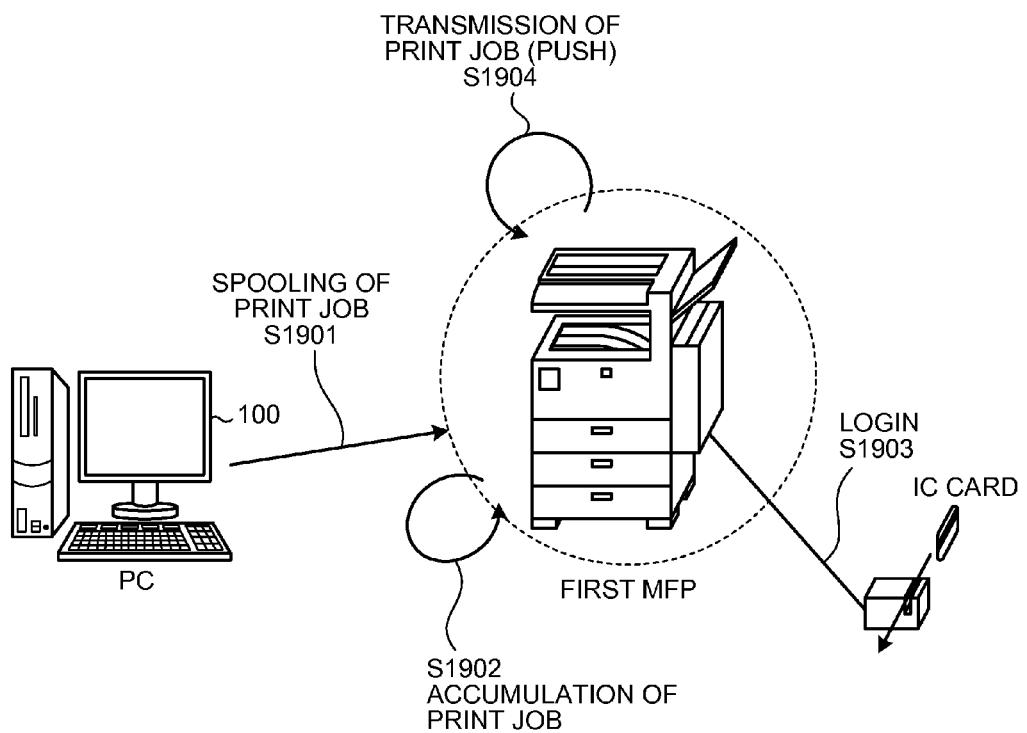
FIG. 24 is a schematic of a process in which a print job is input by a PC and is output by a first MFP according to the second embodiment.

Processing started from the PC 100 and until a time when the first MFP 1801 performs output will now be described. FIG. 24 is a schematic showing the processing started from the PC 100 and until a time when the first MFP 1801 performs output.

To transmit a print job to the first MFP 1801, the PC 100 performs spooling of the print job (Step S1901). The first MFP 1801 then accumulates therein the print job (Step S1902).

Subsequently, an IC card authentication unit 311 of the first MFP 1801 accepts login of the user using an IC card (Step S1903). The IC card authentication unit 311 of the first MFP 1801 reads authentication information corresponding to a ID card number from a card ID and authentication information association storage unit 351. A job processing unit 312 then specifies a print job ID associated with the authentication information from a job ID association storage unit 353.

Subsequently, the job processing unit 312 displays a list of print jobs identified by the print job IDs thus specified. When receiving selection of a print job from the user, the job processing unit 312 transmits the print job thus selected (Step S1904) to perform print processing.

With the processing described above, transmission and reception of data between the first MFP 1801 and the PC 100 enables print processing of the print job.

A communication path connected between the PC 100 and each of the MFPs is not restricted. The PC 100 and each of the MFPs may be connected by a local area network (LAN) or a public network.

In the embodiments described above, if printing is performed at an MFP including an authentication mechanism, the job tracking application 703 of the PC 100 can monitor the printing until the printing is completed. Displaying a state of a job and performing notification of a result of a job enables a user to determine whether printing is completed or failed without leaving his or her seat. Therefore, convenience is improved.

In the embodiments described above, displaying a result of a job on the display device enables a user to check for a result of a job without leaving his or her seat. Furthermore, notifying a user of state information of a job by means of transmission of an e-mail enables the user to check for a result of the job even if the user leaves his or her seat because being on the move, for example. Even if a user outputs a job to an apparatus at a place where the user is visiting, for example, the user can check for a result of the job reliably. Therefore, a burden on a user can be reduced.

In the embodiments described above, output of state information of a job is restricted by terminating notification thereof when the predetermined time has elapsed. As a result, a user needs not terminate the notification of the state information of the job (delete display thereof) each time, whereby a burden of the user can be reduced.

In the embodiments described above, state information of a job is recorded on the job history storage unit 719 for a certain period of time. Thus, even if a user forgets a result of a print job after time has elapsed since the user issued a print instruction, the user can check for a result of the print job. As a result, it is possible to prevent the user from duplicating the print instruction erroneously. Therefore, waste can be avoided and resource saving can be achieved.

In the embodiments described above, by getting details of an error, a user can determine a necessary action, such as removing a trouble and recovering print data in an apparatus. Therefore, a burden of a user can be reduced.

In the embodiments described above, if a large amount of print jobs are input, for example, a user can be notified of a result thereof collectively. As a result, the user can check for the result of the jobs with centralized information. Therefore, trouble of the user can be reduced.

Third Embodiment

In the first and the second embodiments, an example in which an MFP manages a job has been explained. However, the present invention is not limited to a configuration in which an MFP manages a job, and a server that manages a job may be provided. In a third embodiment, an example in which a print server that manages a job is provided will be explained.

In the first embodiment, the PC inquires of the first MFP a state of a job. In the third embodiment, query of a state of a job is output to the print server to match with a way of managing a state of a job. Because a method of inquiring a state of a job is the same as that in the first embodiment except that an apparatus of a target of query is changed from the first MFP to the print server, explanation thereof will be omitted.

Figure 25:
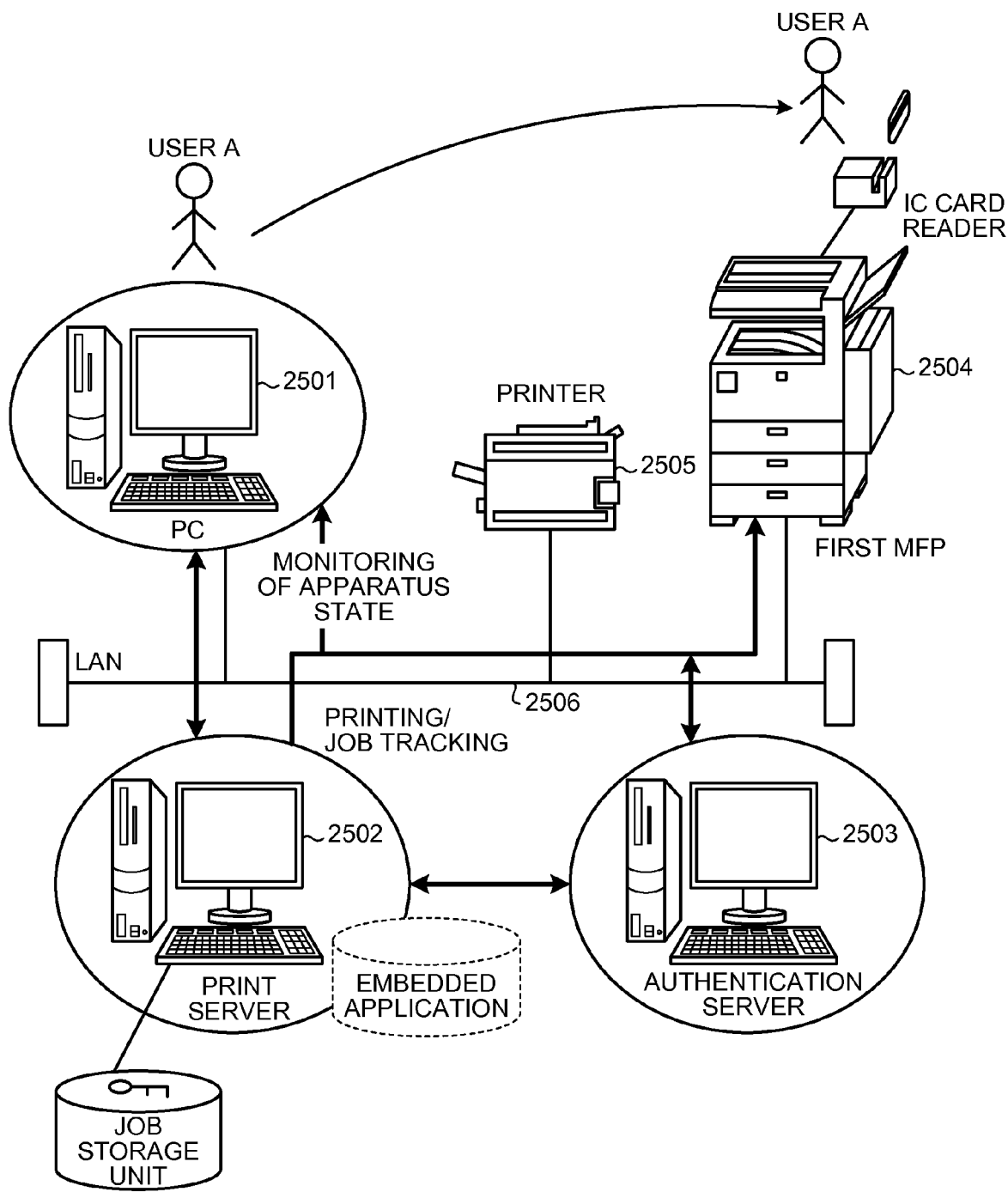
FIG. 25 is a schematic of a configuration of a print processing system according to a third embodiment.

FIG. 25 is a schematic of a configuration of a print processing system according to the third embodiment. In an example of the print processing system illustrated in FIG. 25, a PC 2501, a print server 2502, an authentication server 2503, a first MFP 2504, and a printer 2505 are connected to one another via a LAN 2506.

In the example illustrated in FIG. 25, the PC 2501 transmits a job to perform printing to the print server 2502. The job transmitted to the print server 2502 can be printed by any printing apparatus connected to the print server 2502 via the LAN 2506 (e.g., the printer 2505 or the first MFP 2504). If a user A outputs a job from the PC 2501 to the print server 2502, for example, the job is stored in a job storage unit of the print server 2502. Thus, the user A can output the job from any printing apparatus included in the print processing system. To perform printing by the first MFP 2504, for example, the user A moves to the first MFP 2504 to perform authentication with an IC card reader at the first MFP 2504. As a result, the first MFP 2504 acquires the job desired by the user A from the print server 2502 to perform print processing in accordance with the job. In the present embodiment, authentication is performed twice when a job is output to the print server 2502 and when the first MFP 2504 is utilized. The authentication server 2503 is used for the authentication.

To inquire a state of a job, etc., a user inputs a card ID to a card reader (not illustrated) of a certain MFP (e.g., the first MFP 2504). Subsequently, the certain MFP transmits the card ID to the authentication server 2503. The authentication server 2503 then performs authentication using the card ID. If the authentication is performed with no problem, the authentication server 2503 transmits authentication information associated with the card ID to the first MFP 2504. Thus, the certain MFP (e.g., the first MFP 2504) can acquire a state of a job associated with the authentication information and a list of jobs associated with the authentication information, for example.

In the first and the second embodiments, because a state of a job can be acquired from the PC, a state in which an error occurs in the job, etc. can be grasped. However, a result of printing of the job cannot be referred to.

To address this, in the print processing system according to the present embodiment, an apparatus, such as the PC 2501 or the first MFP 2504, can display preview image data of a job.

The preview image data is image data indicating a printed matter obtained by performing printing in accordance with a predetermined print setting. In the present embodiment, information indicating a print setting is referred to as print setting information.

In the present embodiment, the user can refer to preview image data indicating a result of printing related to any job accumulated in the print server 2502 even before printing of a relevant job is performed. Thus, by viewing a preview image data from various types of apparatuses, the user can predict, before printing, a printed matter (a recording medium) output when the printing is actually performed. Therefore, in the present embodiment, it is possible to suppress a printing error (e.g., printing of a false job) and to improve convenience.

Figure 26:
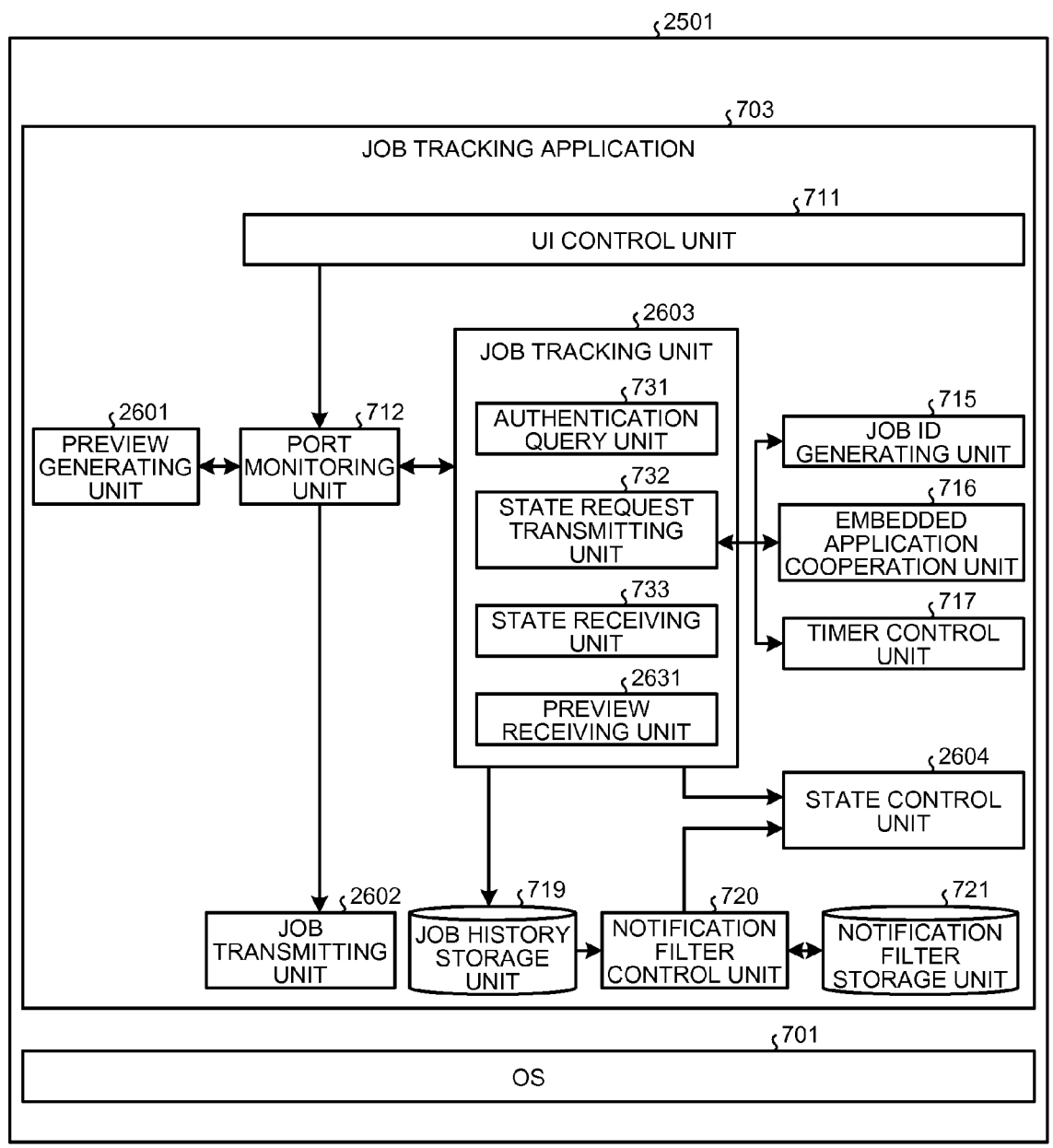
FIG. 26 is a diagram of a block configuration of a PC according to the third embodiment.

FIG. 26 is a diagram of a block configuration of the PC 2501 according to the present embodiment. The PC 2501 illustrated in FIG. 26 is different from the PC 100 according to the first embodiment as follows: a preview generating unit 2601 is added; the job transmitting unit 713 is replaced by a job transmitting unit 2602 that performs processing different from processing performed by the job transmitting unit 713; the job tracking unit 714 is replaced by a job tracking unit 2603 that performs processing different from processing performed by the job tracking unit 714; and the state control unit 718 is replaced by a state control unit 2604 that performs processing different from processing performed by the state control unit 718. In explanation below, components similar to those in the first embodiment are represented by similar reference numerals, and explanations thereof will be omitted.

The preview generating unit 2601 generates preview image data indicating a result of printing of a job. The preview image data generated by the preview generating unit 2601 according to the present embodiment is transmitted to the print server 2502.

In accordance with control of a port monitoring unit 712, the job transmitting unit 2602 transmits a job to perform printing or sending a FAX of image information, a job ID identifying the job, authentication information, and preview image data generated by the preview generating unit 2601 to the print server 2502. Furthermore, the job transmitting unit 2602 transmits print setting information used for printing of the job to the print server 2502.

Figure 27:
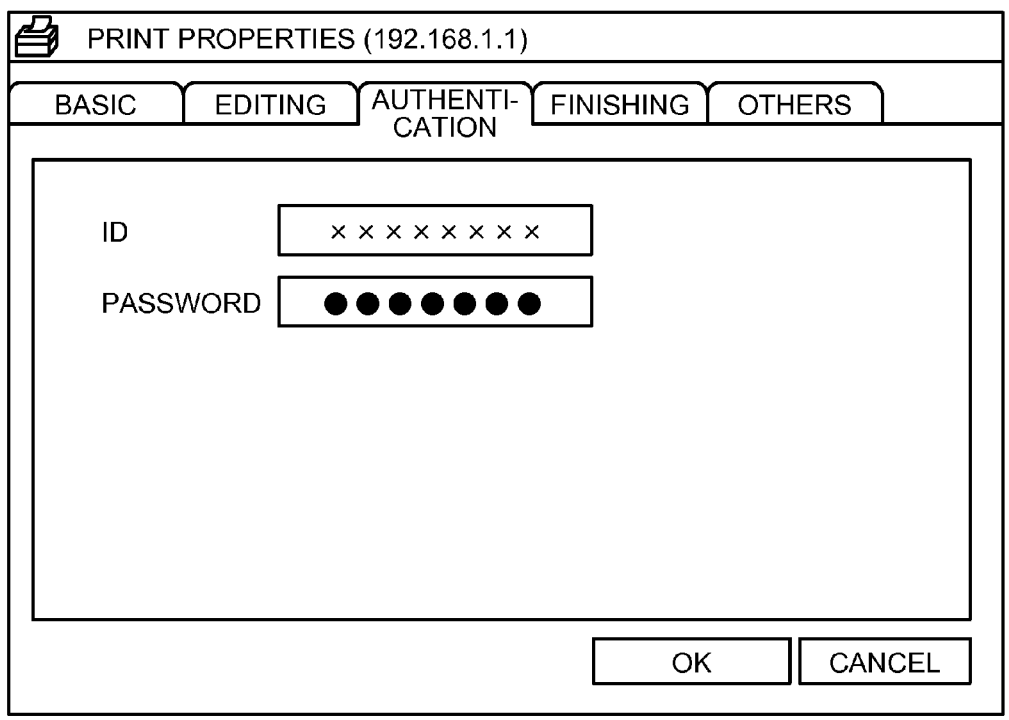
FIG. 27 is a schematic of an exemplary input screen for authentication information.

The authentication information transmitted by the job transmitting unit 2602 is information input by a user on a display screen in advance. FIG. 27 is a schematic of an exemplary input screen of the authentication information. On the exemplary input screen illustrated in FIG. 27, input of an ID and a password as the authentication information is received.

Referring back to FIG. 26, an embedded application cooperation unit 716 according to the present embodiment functions as an interface that cooperates with an embedded application 3223 and a job MIB processing unit 315 of the print server 2502.

The job tracking unit 2603 includes a preview receiving unit 2631 in addition to a configuration of the job tracking unit 714 according to the first embodiment.

The preview receiving unit 2631 receives preview image data indicating a result of processing of a job transmitted from the job transmitting unit 2602 via the embedded application cooperation unit 716 from the print server 2502.

If a plurality of apparatuses that can execute a job are provided as described in the present embodiment, a state receiving unit 733 according to the present embodiment receives state information indicating at least one of a stage in which the job is accumulated in the print server 2502 and a stage in which a job acquired from the print server 2502 is executed by any one of one or more printing apparatuses, such as the first MFP 2504, as the state information of the job associated with a job ID.

The state control unit 2604 outputs preview image data received by the preview receiving unit 2631 besides the state information received by the state receiving unit 733 to a display device, which is not illustrated, as described in the embodiment described above.

Figure 28:
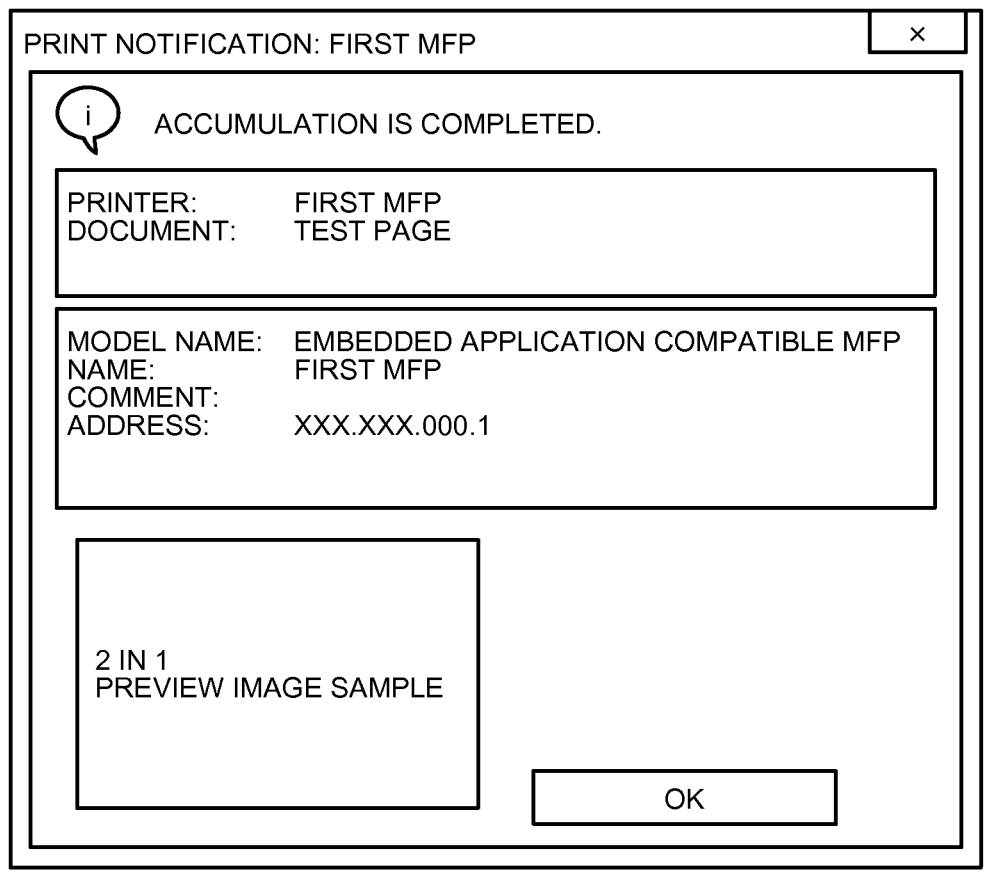
FIG. 28 is a schematic of an example of a pop-up screen displayed by a state control unit when accumulation of a print job is completed in the third embodiment.

FIG. 28 is a schematic showing an example of a pop-up screen displayed by the state control unit 2604 when accumulation of a print job is completed in the third embodiment. In the present embodiment, the pop-up screen displays the preview image data received by the preview receiving unit 2631.

Figure 29:
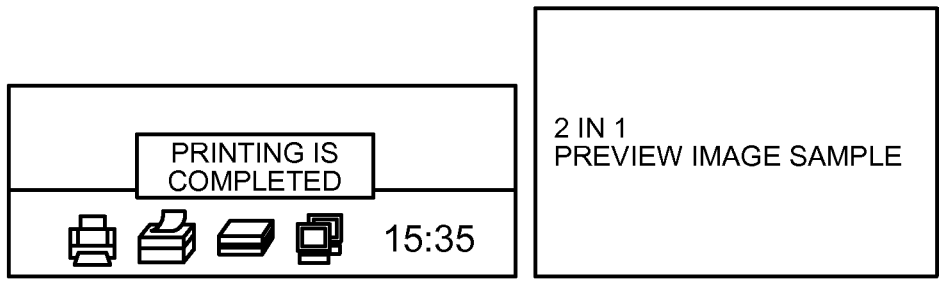
FIG. 29 is a schematic of an example of a notification screen displayed by the state control unit when printing is completed in the third embodiment.

FIG. 29 is a schematic showing an example of a notification screen displayed by the state control unit 2604 when printing is completed in the third embodiment. In the present embodiment, the notification screen displays the preview image data received by the preview receiving unit 2631. In the example illustrated in FIG. 29, the preview image data is displayed as a balloon near a task bar on the display screen.

FIG. 30 is a schematic showing a first example of a job list screen displayed by the state control unit 2604. The job list screen according to the present embodiment is a screen displayed in accordance with an operation performed by a user. The job list screen illustrated in FIG. 30 displays preview image data for each job. In the example illustrated in FIG. 30, image data of a first page of document data to be printed in accordance with a job is displayed for each job. Image data displayed as preview image data is not limited to the first page of document data. Alternatively, a second page or a page subsequent thereto may be displayed, or a plurality of pages of image data may be displayed. Timing of displaying the job list screen is not restricted in particular. The timing may be timing at which an operation to display the list screen is received from a user, for example.

Figure 31:
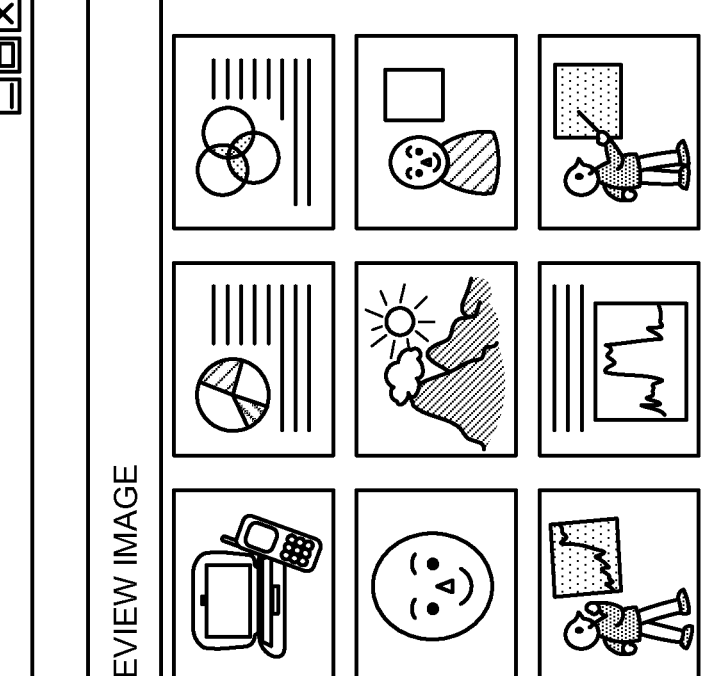
FIG. 31 is a schematic of a second example of the job list screen displayed by the state control unit according to the third embodiment.

FIG. 31 is a schematic showing a second example of a job list screen displayed by the state control unit 2604. In the example illustrated in FIG. 31, preview image data of three pages is displayed for each job. This facilitates identifying the document data of each job by a user. The number of pages of preview image data displayed on a job list screen is not limited to three, and preview image data of two pages or four or more pages may be displayed.

In the present embodiment, with a job tracking application 703 incorporated into the PC 2501 as a virtual printer driver, a user is enabled to accumulate a job by the simply selecting the virtual printer driver from a document creation application. Furthermore, referring to properties of the virtual printer driver enables the user to refer to preview image data that is a result of processing performed by the virtual printer driver.

By generating preview image data in the virtual printer driver in this manner, it is possible to provide preview image data independent of a printer language or a specification of an output apparatus. In other words, the print server can be used in any environment, thereby making it possible to reduce introduction costs of a user.

Figure 32:
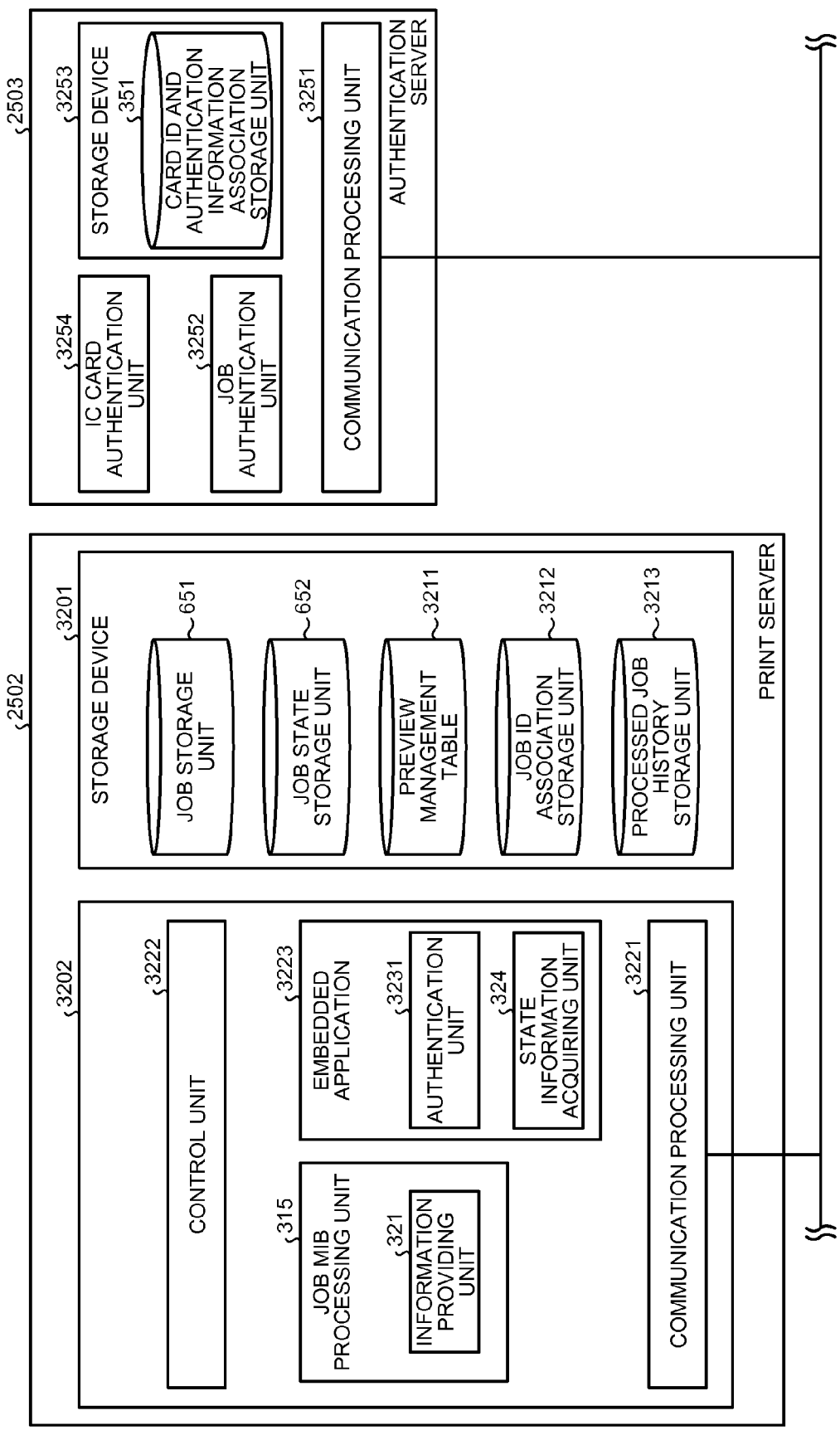
FIG. 32 is a diagram of a block configuration of a print server and an authentication server according to the third embodiment.

FIG. 32 is a diagram of a block configuration of the print server 2502 and the authentication server 2503 according to the present embodiment. In an example illustrated in FIG. 32, among components included in the print server 2502 and the authentication server 2503, components similar to those in the first embodiment are represented by similar reference numerals, and explanation thereof will be omitted.

The print server 2502 includes a software configuration 3202 and a storage device 3201. The print server 2502 includes the configuration of the second MFP 151 and the configuration of the first MFP 152 according to the first embodiment. The print server 2502 stores therein a job received from the PC 2501, and transmits the job to another MFP or a printer in response to a request.

The storage device 3201 includes a job storage unit 651, a job state storage unit 652, a processed job history storage unit 3213, a job ID association storage unit 3212, and a preview management table 3211.

The job ID association storage unit 3212 stores therein information on a job received by a communication processing unit 3221. FIG. 33 is a schematic showing a table structure of the job ID association storage unit 3212 according to the third embodiment. As illustrated in FIG. 33, the job ID association storage unit 3212 stores therein a job ID identifying a job, authentication information used for authentication of the job, and print setting information used for printing of the job in a manner associated with one another.

The preview management table 3211 is a table that manages information on preview image data received from the PC 2501. FIG. 34 is a schematic of a table structure of the preview management table 3211. As illustrated in FIG. 34, the preview management table 3211 stores therein a job ID, a start time at which printing of a job is requested, size of preview image data, and a binary part of the preview image data in a manner associated with one another. Such association of a job ID with preview image data makes it possible to provide the preview image data corresponding to the job.

The processed job history storage unit 3213 stores therein state information of a job received by the communication processing unit 3221 as a history. FIG. 35 is a schematic showing a table structure of the processed job history storage unit 3213 according to the present embodiment. As illustrated in FIG. 35, the processed job history storage unit 3213 stores therein a job ID, a start time, a job state, a name of an output apparatus, an apparatus state, a name of a document, and print setting information in a manner associated with one another.

Referring back to FIG. 32, the software configuration 3202 includes a control unit 3222, a job MIB processing unit 315, an embedded application 3223, and the communication processing unit 3221.

The communication processing unit 3221 transmits and receives data to and from the first MFP 2504 or the PC 2501. The communication processing unit 3221 receives a job, a job ID identifying the job, authentication information required for authentication of the job, preview image data, and print setting information from the PC 2501, for example.

To perform authentication, the communication processing unit 3221 transmits authentication information to the authentication server 2503, and receives an authentication result of the authentication information. After the authentication is performed and the control unit 3222 completes registration of information on the job thus received, the communication processing unit 3221 transmits preview image data to the PC 2501.

If the communication processing unit 3221 receives a request to transmit the job from the first MFP 2504, the communication processing unit 3221 transmits the information on the job thus received to the first MFP 2504.

The control unit 3222 adds, updates, and deletes a record of the job storage unit 651, the job state storage unit 652, the processed job history storage unit 3213, the job ID association storage unit 3212, and the preview management table 3211.

The control unit 3222 adds, updates, and deletes a record of the job state storage unit 652 in accordance with a state of a job, for example. Furthermore, the control unit 3222 registers information on preview image data received from the communication processing unit 3221 in the preview management table 3211, and registers information on a job received in the job ID association storage unit 3212, for example.

The job MIB processing unit 315 includes an information providing unit 321, and provides information indicating a state of an apparatus (e.g., the second MFP 151) and information indicating a state of a job retained by an apparatus to another apparatus.

The embedded application 3223 includes an authentication unit 3231 and a state information acquiring unit 324, and provides a state of a job to the PC 100.

When receiving a job, the authentication unit 3231 transmits authentication information received along with the job to the authentication server 2503 via the communication processing unit 3221, and requests authentication to determine whether the job can be managed. The authentication unit 3231 then receives an authentication result from the authentication server 2503 via the communication processing unit 3221. Only if the authentication is performed properly, the control unit 3222 registers information on the job, etc.

The control unit 3222, for example, stores and accumulates the job ID identifying the job received by the communication processing unit 3221, the authentication information used for authentication of the job, and print setting information used for printing of the job in the job ID association storage unit 3212 in a manner associated with one another.

The control unit 3222 registers and stores information indicating a stage in which the job is accumulated in the print server 2502 (e.g., "accumulated") in the job state storage unit 652 as state information of the job accumulated in the job ID association storage unit 3212.

The communication processing unit 3221 receives authentication information from the first MFP 2504.

When receiving the authentication information, the communication processing unit 3221 transmits the job, that is associated with the job ID stored in the job ID association storage unit 3212 and identified by the authentication information and state information of which job indicates the stage in which the job is accumulated in the print server 2502 (e.g., "accumulated"), to the first MFP 2504.

If the job transmitted by the communication processing unit 3221 is executed by the first MFP 2504 that is a transmission destination of the job, the control unit 3222 updates the state information from information indicating the stage in which the job is accumulated in the print server 2502 (e.g., "accumulated") to information indicating a stage in which the job is executed by the first MFP 2504 with no problem (e.g., "succeed").

If the communication processing unit 3221 receives a job ID and authentication information from the PC 2501, the authentication unit 3231 performs authentication based on whether the authentication information and the job ID thus received are associated with each other in the job ID association storage unit 3212. In the present embodiment, if the authentication information and the job ID are associated with each other, the authentication unit 3231 recognizes that the authentication is performed properly.

If the authentication is performed properly, the state information acquiring unit 324 searches the processed job history storage unit 3213 using the job ID received from the PC 2501 as a search key. If the job ID is registered, it is possible to recognize that a state of the job identified by the job ID is the stage of processed. By contrast, if the job ID is not registered in the processed job history storage unit 3213, the state information acquiring unit 324 searches the job state storage unit 652 using the job ID as a search key. Thereby, the state information acquiring unit 324 acquires the state information.

The job MIB processing unit 315 includes the information providing unit 321, and provides information indicating a state of an apparatus (e.g., the second MFP 151) and information indicating a state of a job retained by an apparatus to another apparatus.

If proper authentication is performed, the information providing unit 321 transmits the state of the job acquired by the state information acquiring unit 324 to the PC 2501. Furthermore, the information providing unit 321 provides the state of the first MFP 2504 or the state of the second MFP 151 to the PC 2501.

The control unit 3222 registers a job ID identifying a job processed by another printing apparatus (e.g., the first MFP 2504) in the processed job history storage unit 3213.

The authentication server 2503 includes an IC card authentication unit 3254, a communication processing unit 3251, a job authentication unit 3252, and a storage device 3253. The authentication server 2503 performs authentication and transmits an authentication result in accordance with a request from another apparatus.

The communication processing unit 3251 transmits and receives data between the authentication server 2503 and the print server 2502.

The storage device 3253 stores therein a card ID and authentication information association storage unit 351. Because table structure of the card ID and authentication information association storage unit 351 is the same as that in the first embodiment, explanation thereof will be omitted.

If authentication information is transmitted from the print server 2502, the job authentication unit 3252 performs authentication using the authentication information and the card ID and authentication information association storage unit 351.

The IC card authentication unit 3254 performs authentication based on a card ID input from a card reader (not illustrated) provided in the first MFP 2504, for example. In the present embodiment, when receiving information on the card ID from the first MFP 2504, the IC card authentication unit 3254 performs authentication by referring to the card ID and authentication information association storage unit 351. If the authentication is performed properly, the IC card authentication unit 3254 acquires authentication information associated with the card ID thus input in the card ID and authentication information association storage unit 351, and transmits the authentication information along with the authentication result to the first MFP 2504. Thus, the first MFP 2504 can acquire information on the job associated with the authentication information from the print server 2502.

Figure 36:
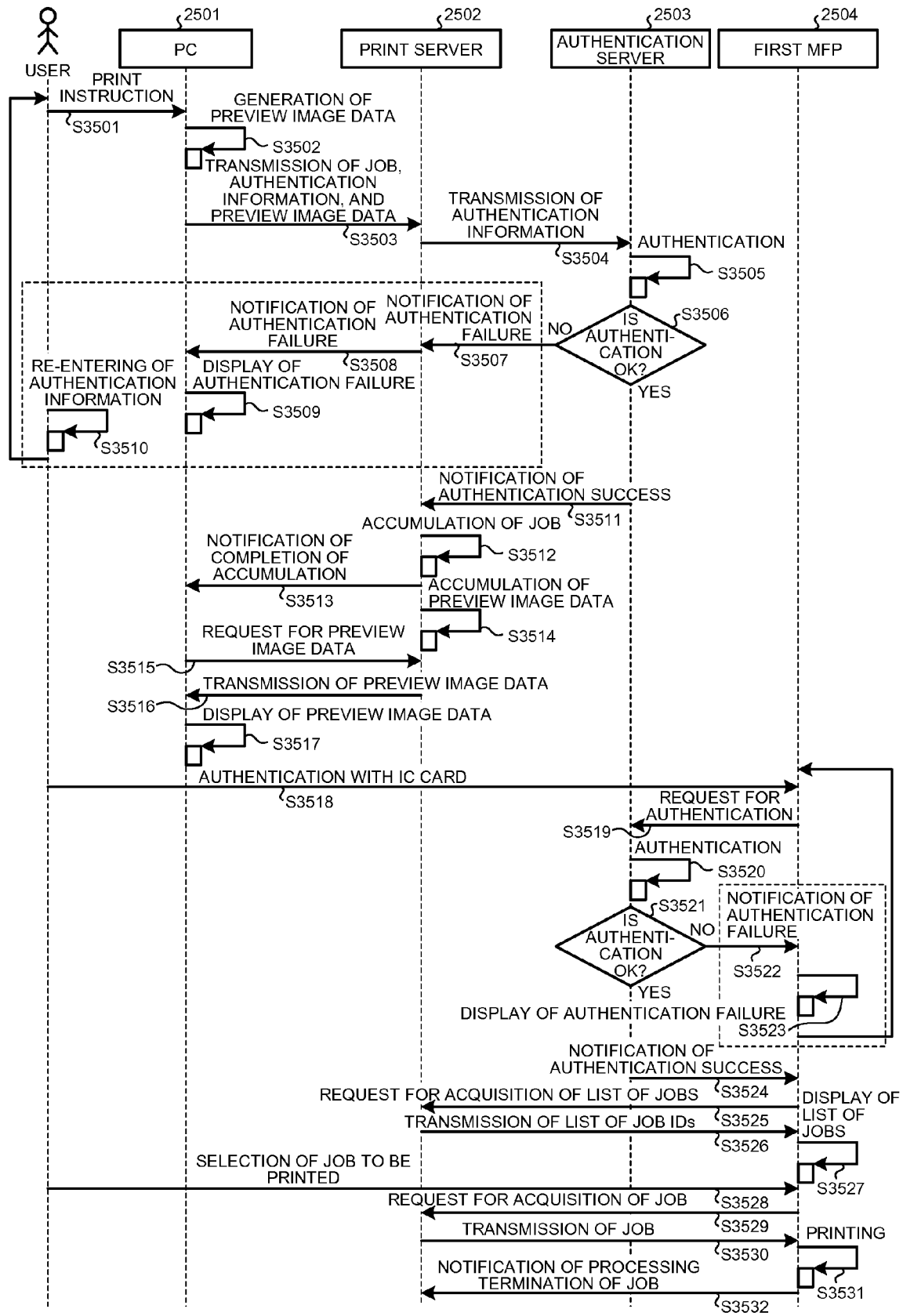
FIG. 36 is a sequence diagram of a process until printing is completed in the print processing system according to the third embodiment.

FIG. 36 is a sequence diagram showing processing until printing is completed in the print processing system according to the present embodiment.

As illustrated in FIG. 36, the user instructs the PC 2501 to print a document (Step S3501). The preview generating unit 2601 of the PC 2501 then generates preview image data related to the document that is a target of a print instruction in accordance with control of the port monitoring unit 712 (Step S3502).

Subsequently, the job transmitting unit 2602 transmits a job that is a target of the print instruction, authentication information of the user who logs into the PC 2501, and the preview image data to the print server 2502 (Step S3503). At this time, the job transmitting unit 2602 also transmits print setting information.

If the communication processing unit 3221 of the print server 2502 receives the job, the authentication information, the preview image data, and the print setting information, the communication processing unit 3221 transmits the authentication information to the authentication server 2503 in accordance with the authentication unit 3231 (Step S3504).

Subsequently, the job authentication unit 3252 performs authentication based on the authentication information thus received and the card ID and authentication information association storage unit 351 (Step S3505). The job authentication unit 3252 then determines whether the authentication information is appropriate (Step S3506). If the job authentication unit 3252 determines that the authentication information is not appropriate (No at Step S3506), the communication processing unit 3251 notifies the print server 2502 of the fact that the authentication fails (Step S3507). Furthermore, the communication processing unit 3221 of the print server 2502 notifies the PC 2501 of the fact that the authentication fails (Step S3508).

The state control unit 2604 of the PC 2501 displays the fact that the authentication fails (Step S3509). As a result, the user re-enters authentication information in the PC 2501 (Step S3510). Thus, the system control is returned to Step S3501.

By contrast, if the job authentication unit 3252 determines that the authentication information is appropriate at Step S3506 (Yes at Step S3506), the communication processing unit 3251 notifies the print server 2502 of the fact that the authentication is performed properly (Step S3511).

If the print server 2502 receives the fact that the authentication is performed properly, the control unit 3222 accumulates the job in the job storage unit 651 (Step S3512). At this time, the control unit 3222 registers the job ID and information indicating the stage in which the job is accumulated in the print server 2502 (e.g., "accumulated") in the job state storage unit 652 in a manner associated with each other. Furthermore, the print server 2502 notifies the PC 2501 of the fact that the accumulation is completed (Step S3513).

The control unit 3222 accumulates preview image data corresponding to the job, and registers information on the preview image data in the preview management table 3211 (Step S3514).

Subsequently, a state request transmitting unit 732 of the PC 2501 transmits a request for the preview image data along with the job ID to the print server 2502 (Step S3515).

The communication processing unit 3221 of the print server 2502 then reads the preview image data associated with the job ID in the preview management table 3211 via the control unit 3222, and transmits the preview image data to the PC 2501 (Step S3516).

The state control unit 2604 of the PC 2501 displays the preview image data (Step S3517). Because the exemplary screen is already described, the explanation thereof will be omitted.

Because the job is accumulated in the print server 2502, the user moves to the first MFP 2504 to start an operation for performing printing of the job.

The user causes the card reader to read an IC card, and starts to perform authentication to the first MFP 2504 (Step S3518). The first MFP 2504 then transmits an authentication request along with information of the IC card thus read to the authentication server 2503 (Step S3519).

The IC card authentication unit 3254 of the authentication server 2503 performs authentication using the information of the IC card thus received and the card ID and authentication information association storage unit 351 (Step S3520). The IC card authentication unit 3254 determines whether the information of the IC card thus received is appropriate (Step S3521). If the IC card authentication unit 3254 determines that the information is not appropriate (No at Step S3521), the communication processing unit 3251 notifies the first MFP 2504 of the fact that the authentication fails (Step S3522). Furthermore, the first MFP 2504 displays the fact that the authentication fails (Step S3523). As a result, the user restarts authentication using the IC card (Step S3518).

By contrast, if the IC card authentication unit 3254 determines that the authentication information is appropriate at Step S3521 (Yes at Step S3521), the communication processing unit 3251 notifies the first MFP 2504 of the fact that the authentication is performed properly along with the authentication information associated with the information of the IC card (Step S3524)

If the authentication is performed properly, the first MFP 2504 transmits a request for acquiring a list of jobs along with the authentication information received from the authentication server 2503 to the print server 2502 (Step S3525). The print server 2502 then transmits a list of job IDs associated with the authentication information (Step S3526). The job IDs to be transmitted are job IDs for which the information indicating the stage in which the job is accumulated in the print server 2502 (e.g., "accumulated") is registered in the job state storage unit 652. In other words, a job ID of which printing has already been performed need not be transmitted.

The first MFP 2504 displays the list of jobs based on the job IDs thus received (Step S3527).

The first MFP 2504 receives selection of a job from the list of jobs thus displayed in accordance with an operation performed by the user (Step S3528). The first MFP 2504 then transmits a request for acquiring the job thus selected along with the job ID to the print server 2502 (Step S3529).

The print server 2502 transmits the job identified by the job ID thus received along with print setting information (Step S3530). The first MFP 2504 performs printing of the job based on the print setting information (Step S3531).

Subsequently, the first MFP 2504 notifies the print server 2502 of the fact that the processing of the job is finished (Step S3532). As a result, the job state is updated. The control unit 3222, for example, updates the state of the job associated with the printed job ID indicating the stage in which the job is accumulated in the print server 2502 (e.g., "accumulated") with the stage in which the job is executed by the first MFP 2504 with no problem (e.g., "succeed") to the job state storage unit 652.

In the print processing system according to the present embodiment, the configuration described above enables the print server 2502 to manage jobs collectively. The print server 2502 can provide a job to a desired printer. Thus, the user can acquire a recording medium on which printing of the job is performed from the printer desired by the user.

In the present embodiment, the jobs are managed collectively not by the MFPs in the first and the second embodiments but by the print server 2502. Introducing an apparatus specialized for managing the jobs in this manner makes it possible to create a large-scale print processing system.

In the print processing system according to the present embodiment, the PC 2501 generates preview image data, and the print server 2502 manages the preview image data. This configuration enables the print server 2502 to transmit the preview image data in response to a request from other apparatuses, for example. The preview image data thus transmitted enables the user to check for a result of printing. As described above, the convenience is improved in the present embodiment.

In the present embodiment, the explanation has been made of the case where the PC 2501 displays the preview image data, for example. However, the apparatus that displays the preview image data may be any apparatus capable of transmitting and receiving data to and from the print server 2502, and is not limited to the PC 2501.

In the present embodiment, authentication is performed using authentication information even when the PC 2501 transmits a job to the print server 2502. However, application of the authentication performed when transmitting a job is not limited to the present embodiment, and the authentication may also be performed when transmitting a job in the first and the second embodiments, for example.

In the present embodiment, the explanation has been made of the case where the PC 2501 displays the preview image data before printing, for example. However, display of the preview image data is not limited to such a situation. In other words, because the print server 2502 stores therein the information on the job even after the printing is finished, the print server 2502 may transmit the preview image data related to the job of which printing is finished in response to a request from the PC 2501 after the printing is finished, for example. The print server 2502, for example, transmits a list of job IDs associated with the authentication information transmitted from the PC 2501 to the PC 2501. Subsequently, the print server 2502 may transmit preview image data associated with a job ID transmitted as a job ID selected from the list in the PC 2501 to the PC 2501, for example.

Application of the preview of a job is not limited to the configuration in the third embodiment, and the preview of a job may be realized in the print processing system including the MFPs in the first and the second embodiments.

In the present embodiment, the explanation has been made of the case where the preview image data is managed with a table. However, management of the preview image data is not limited to the method using a table. Alternatively, the preview image data may be managed in other formats, and may be managed in the XML format, for example.

Fourth Embodiment

In the third embodiment, the explanation has been made of the case where the PC 2501 generates preview image data, for example. In the third embodiment, however, generation of preview image data is not limited to generation by a PC serving as a transmitter of a job. In a fourth embodiment, an explanation will be made of the case where a print server generates preview image data, for example. Because the processing performed by the PC is the same as that in the third embodiment except that the PC generates no preview image data, the explanation thereof will be omitted.

Figure 37:
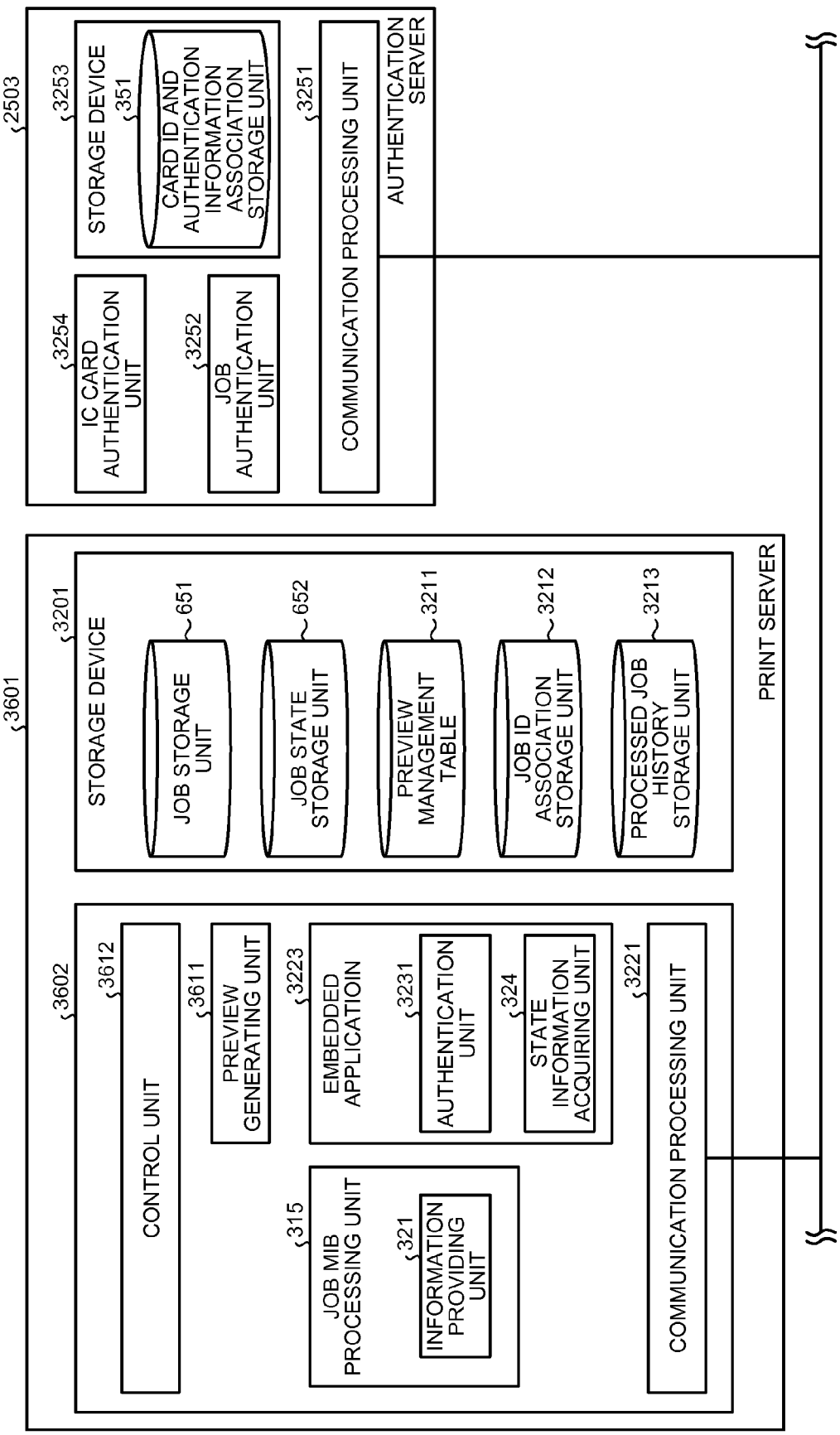
FIG. 37 is a diagram of a block configuration of a print server and an authentication server according to a fourth embodiment.

FIG. 37 is a diagram of a block configuration of a print server 3601 and an authentication server 2503 according to the present embodiment. In the example illustrated in FIG. 37, in the configuration included in the print server 3601 and the authentication server 2503, components similar to those in the third embodiment are represented by similar reference numerals, and the explanations thereof will be omitted.

A software configuration 3602 of the print server 3601 is different from the software configuration 3202 of the print server 2502 according to the third embodiment in that a preview generating unit 3611 is added and that the control unit 3222 is replaced by a control unit 3612 that performs different processing.

The preview generating unit 3611 generates preview image data indicating a result of printing of a received job. The preview generating unit 3611 according to the present embodiment generates preview image data of a job transmitted from a PC 2501.

The control unit 3612 adds, updates, and deletes records of a job storage unit 651, a job state storage unit 652, a processed job history storage unit 3213, a job ID association storage unit 3212, and a preview management table 3211.

The control unit 3612, for example, registers information on the preview image data generated by the preview generating unit 3611 in the preview management table 3211, and registers information on the job thus received in the job ID association storage unit 3212.

In the present embodiment, if a first MFP 2504 changes the settings when performing printing of a job, the preview generating unit 3611 generates preview image data based on the settings thus changed, and the control unit 3612 updates records stored in the preview management table 3211 and the processed job history storage unit 3213 so as to store therein the settings thus changed. Because processing other than the processing described above is the same as that in the third embodiment, the explanation thereof will be omitted.

Figure 38:
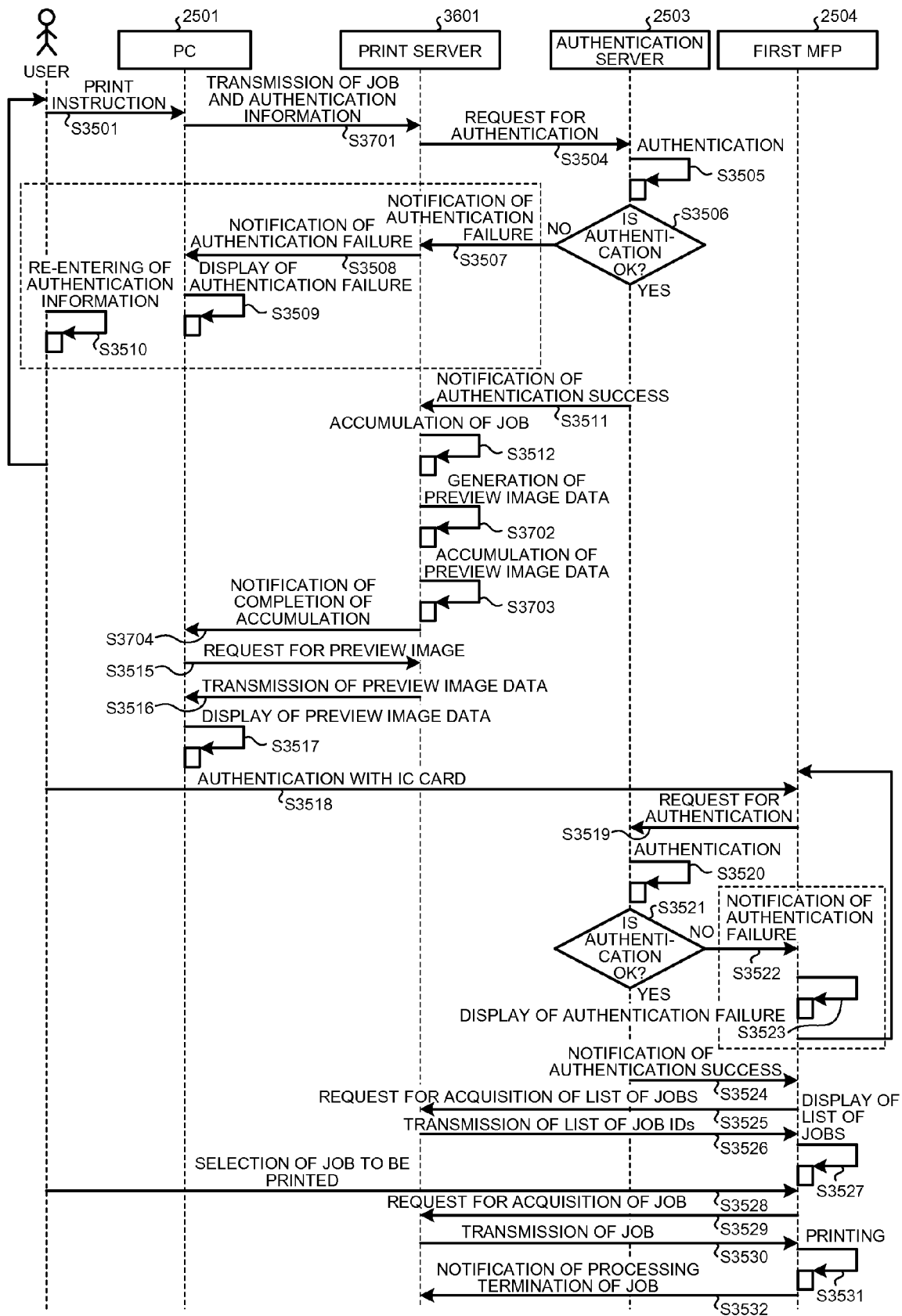
FIG. 38 is a sequence diagram of a process until printing is completed in a print processing system according to the fourth embodiment.

FIG. 38 is a sequence diagram of a process until printing is completed in a print processing system according to the present embodiment. The same steps as those in the sequence illustrated in FIG. 36 of the third embodiment are represented by the same step numbers as those in FIG. 36 (e.g., Step S3501, Step S3504 to Step S3510, and Step S3515 to Step S3532).

Similarly to the sequence illustrated in FIG. 36 of the third embodiment, the user instructs the PC 2501 to print a document (Step S3501). Subsequently, a job transmitting unit 2602 of the PC 2501 transmits a job that is a target of the print instruction, authentication information of the user who logs into the PC 2501, and print setting information to the print server 3601 (Step S3701).

Similarly to the sequence in the third embodiment, the processing from authentication to accumulation of a job is performed (Step S3504 to Step S3512).

Subsequently, the preview generating unit 3611 of the print server 3601 generates preview image data indicating a result of printing obtained when printing of the job thus received is performed in accordance with the print setting information thus received (Step S3702). The control unit 3612 then accumulates the preview image data thus generated, and registers information on the preview image data in the preview management table 3211 (Step S3703). The print server 3601 notifies the PC 2501 of the fact that the accumulation is completed (Step S3704).

Similarly to the third embodiment, the preview image is transmitted to the PC 2501, and printing of the job is performed by the first MFP 2504 (Step S3515 to Step S3532).

Figure 39:
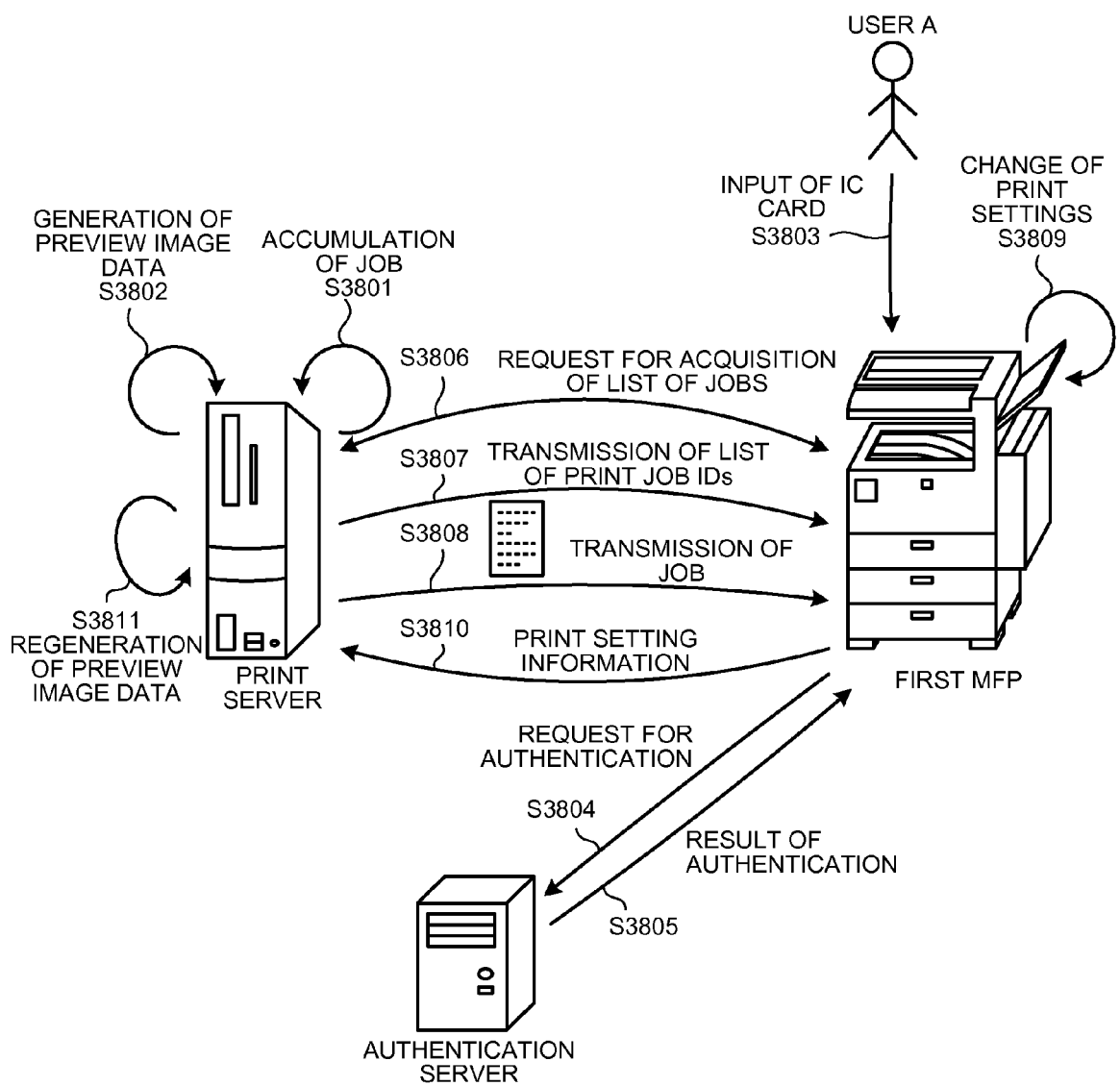
FIG. 39 is a schematic of a process of regeneration of preview image data in the print processing system according to the fourth embodiment.

In the fourth embodiment, if the first MFP 2504 changes the print settings, preview image data is regenerated based on the print settings thus changed. The process of regeneration of preview image data will now be described. FIG. 39 is a schematic of a process of regeneration of preview image data in the print processing system according to the fourth embodiment.

The control unit 3612 of the print server 3601 accumulates a print job (Step S3801). The preview generating unit 3611 then generates preview image data based on the job (Step S3802). The preview image data thus generated is also accumulated.

Subsequently, a user A inputs an IC card to perform printing by the first MFP 2504 (Step S3803). This causes the first MFP 2504 to transmit information of the IC card thus input to the authentication server 2503 (Step S3804). The authentication server 2503 then transmits an authentication result and authentication information associated with the IC card to the first MFP 2504 (Step S3805).

As a result, the first MFP 2504 transmits a request for acquiring a list of jobs along with the authentication information to the print server 3601 (Step S3806). The print server 3601 then transmits a list of job IDs associated with the authentication information (Step S3807). Thus, the first MFP 2504 can acquire the list of jobs.

Furthermore, in response to a request from the first MFP 2504, the print server 3601 transmits a print job included in the list of job IDs to the first MFP 2504 (Step S3808). At this time, the print server 3601 also transmits print setting information used for printing along with the job.

When the user instructs the PC 2501 to perform printing of a job, the user may change the print settings (Step S3809). While one page is allocated to each recording medium in the job, so-called N-in-1 printing may be performed in which a plurality of pages (e.g., two pages) are allocated to one recording medium, for example. As a result, printing is performed based on the print settings thus changed.

Subsequently, the first MFP 2504 notifies the print server 3601 of the fact that the processing of the job is finished. At this time, the first MFP 2504 also transmits the print setting information thus changed (Step S3810).

The control unit 3612 of the print server 3601 accumulates the print setting information thus received, and regenerates preview image data in accordance with the print setting information to accumulate the preview image data (Step S3811).

As described above, the print processing systems according to the third and the fourth embodiments can provide, after transmitting a job to a print server, preview image data to other apparatuses such as a PC before printing or after printing.

This enables the user to check for the preview image data indicating the final result of printing before the printing. As a result, the user can check for the contents obtained by performing the printing in an MFP without leaving his or her seat in advance. Accordingly, it is possible to prevent a typographical error.

Furthermore, when checking for a history related to the job after the printing, the user can refer to the preview image data based on the result of the printing. As a result, if the user performs reprinting using a job printed previously, it is possible to prevent the user from confusing the job with other jobs.

In the embodiments, the explanation has been made of the case where a job for printing or sending a FAX is used, for example. The embodiments, however, are not intended to limit the type of a job, and may be applied to any job executed by an external apparatus.

Furthermore, if the types of the job are different, external apparatuses that execute the job are also different. In other words, an apparatus that manages a job and an apparatus that processes a job are not limited to the print processing apparatus that executes printing, such as an MFP, the print server that manages a print job, and other apparatuses in the embodiments, and can be applied to various types of apparatuses. The apparatuses may be applied to office equipment created in an office environment, for example.

For example, an information processing apparatus, such as a PC, may transmit a certain job including data to a job server that manages the job. The job server may output the job to a job execution apparatus, such as a projector and a PC. One or more certain third apparatuses (e.g., an output apparatus such as an MFP, a projector, and a PC) may output the data included in the job.

Figure 40:
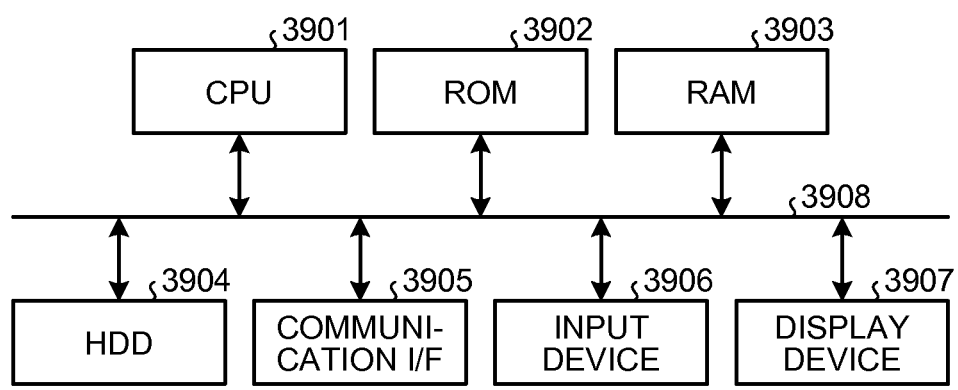
FIG. 40 is a schematic of a hardware configuration of a PC and a print server.

FIG. 40 is a schematic of a hardware configuration of the PC and the print server in the embodiments. As illustrated in FIG. 40, the PC and the print server include a central processing unit (CPU) 3901, a read-only memory (ROM) 3902, a random access memory (RAM) 3903, a hard disk drive (HDD) 3904, a communication interface (I/F) 3905, an input device 3906, a display device 3907, and a bus 3908 connecting these components, and have a hardware configuration using a typical computer.

The job tracking application executed in the PC and the job management application executed in the print server according to the embodiments may be provided in a manner recorded in a computer-readable recording medium, such as a compact disk read-only memory (CD-ROM), a flexible disk (FD), a compact disk recordable (CD-R), and a digital versatile disk (DVD), as a file in an installable or executable format.

The job tracking application executed in the PC and the job management application executed in the print server according to the embodiments may be provided in a manner stored in a computer connected to a network such as the Internet to be made available for downloads via the network. Furthermore, the job tracking application executed in the PC and the job management application executed in the print server according to the embodiments may be provided or distributed over a network such as the Internet.

The job tracking application and the job management application according to the embodiments may be provided in a manner incorporated in a ROM and the like in advance.

The job tracking application executed in the PC according to the embodiments has a module configuration including each module described above (the UI control unit, the port monitoring unit, the job transmitting unit, the job tracking unit, the job ID generating unit, the embedded application cooperation unit, the timer control unit, the state control unit, the notification filter control unit, and the preview generating unit). In actual hardware, the CPU (processor) reads and executes the job tracking application from a storage medium to load each module on the main memory. As a result, the UI control unit, the port monitoring unit, the job transmitting unit, the job tracking unit, the job ID generating unit, the embedded application cooperation unit, the timer control unit, the state control unit, the notification filter control unit, and the preview generating unit are generated on the main memory. Similar processing is performed on the job management application executed by the print server.

The embodiments of the present invention facilitate grasping a state of a job by a user, thereby reducing a burden on the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus operable to be connected to a first external apparatus and one or more second external apparatuses in a communicable manner via a network, the first external apparatus receiving a job and first identification information transmitted from outside the first external apparatus and storing therein the job and the first identification information in a manner associated with each other, the one or more second external apparatus transmitting second identification information to the first external apparatus, acquiring the job associated with the first identification information specified based on the second identification information from the first external apparatus, and executing the job, the information processing apparatus comprising:

a processor including a job transmitting unit configured to transmit the job and the first identification information to the first external apparatus;

the processor including a requesting unit configured to request state information indicating a state of the job capable of being executed by any one of the one or more second external apparatuses and associated with the first identification information transmitted to the first external apparatus, from the first external apparatus;

the processor including a state receiving unit configured to receive state information, the state information indicating a first stage in which the job is accumulated in the first external apparatus and a second stage in which the job acquired from the first external apparatus is executed by any one of the one or more second external apparatuses, as the state information of the job associated with the first identification information from the first external apparatus;

the processor including an authentication query unit configured to generate a job tracking thread based on a job ID associated with the job, the job tracking thread transmitting job tracking information to the authentication query unit; and the processor including a state request transmitting unit configured to,
receive the job tracking information from the authentication query unit, and
transmit state information of the job along with the job ID to any one of the one or more second external apparatuses, the state information being based on the job tracking information.

2. The information processing apparatus according to claim 1, further comprising:

a preview receiving unit configured to receive preview image information indicating a result of processing of the job transmitted by the job transmitting unit from the first external apparatus; and an output unit configured to output the preview image information received by the preview receiving unit to a display device.

3. The information processing apparatus according to claim 1, further comprising:

a generating unit configured to generate preview image information indicating a result of processing of the job transmitted by the job transmitting unit, wherein the job transmitting unit is configured to transmit the preview image information indicating a result of processing of the job along with the job.

4. The information processing apparatus according to claim 1, further comprising:
a state control unit configured to output the state information received by the state receiving unit.

5. The information processing apparatus according to claim 4, wherein the state control unit stops outputting after a predetermined time has elapsed since the state receiving unit received the state information of the job.

6. The information processing apparatus according to claim 4, further comprising:
a storage device including a storage unit configured to store therein the state information of the job received by the state receiving unit as a history.

7. The information processing apparatus according to claim 4, wherein, when the state receiving unit receives state information indicating that the job is not normally completed yet as the state information of the job, the state control unit outputs information indicating that an error occurs in one of the one or more second external apparatuses.

8. The information processing apparatus according to claim 4, wherein the state control unit is configured to output state information of a plurality of jobs for each of the plurality of jobs or outputs state information of a plurality of jobs satisfying a certain condition collectively.

9. The information processing apparatus according to claim 1, wherein the first external apparatus to which the job transmitting unit transmits the job is identical to a job processing apparatus to which an authentication transmitting unit transmits job identification information and authentication information.

10. A job processing system comprising:
an information processing apparatus;
a job management apparatus that receives a job and first identification information transmitted from outside of the job management apparatus and that stores therein the job and the first identification information in a manner associated with each other; and
one or more job execution apparatuses that transmit second identification information to the job management apparatus, acquire the job, associated with the first identification information specified based on the second identification information, from the job management apparatus, and execute the job, the information processing apparatus, the job management apparatus, and the one or more job execution apparatuses being connected in a communicable manner, wherein
the information processing apparatus comprises,
an information processor including a first job transmitting unit configured to transmit the job and the first identification information to the job management apparatus;
the information processor including a requesting unit configured to request state information, the state information indicating a state of the job capable of being executed by any one of the one or more job execution apparatuses and associated with the first identification information transmitted to the job management apparatus, from the job management apparatus; and
the information processor including a state receiving unit configured to receive state information, indicating a first stage in which the job is accumulated in the job management apparatus and a second stage in which the job acquired from the job management apparatus is executed by any one of the one or more job execution apparatuses as the state information of the job associated with the first identification information, from the job management apparatus,
the information processor including an authentication query unit configured to generate a job tracking thread based on a job ID associated with the job, the job tracking thread transmitting job tracking information to the authentication query unit, and
the information processor including a state request transmitting unit configured to,
receive the job tracking information from the authentication query unit, and
transmit state information of the job along with the job ID to any one of the one or more second external apparatuses, the state information being based on the job tracking information, and
the job management apparatus comprises,
a job management processor including a job receiving unit configured to receive the job and the first identification information from the information processing apparatus;
the job management storage device including a job storage unit configured to store and accumulate the job and the first identification information received by the job receiving unit in a storage device in a manner associated with each other;
the job management storage device including a state information storage unit configured to register and store therein state information of the job accumulated by the job storage unit in the first stage;
the job management processor including an identification information receiving unit that receives second identification information from one of the one or more job execution apparatuses;
the job management processor including a second job transmitting unit configured to transmit the job to the one of the one or more job execution apparatuses, the job being stored by the job storage unit and associated with the first identification information specified by the second identification information, the state information of the job being at the first stage;
the job management processor including an updating unit configured to update, when the job transmitted by the second job transmitting unit is executed by the one of the one or more job execution apparatus that is a transmission destination, the state information at the first stage with the state information at the second stage;
the job management processor including a receiving unit configured to receive a request from the requesting unit of the information processing apparatus; and
the job management processor including a state transmitting unit configured to transmit the state information, specified by the request received by the receiving unit and associated with the first identification information, to the information processing apparatus.

11. The job processing system of claim 10, wherein the state information storage unit is configured to:
store a preview image based on a job setting associated with the job when the job receiving unit receives the job from the information processing apparatus, the job setting being set by the information processing apparatus.

12. The job processing system of claim 10, wherein the updating unit configured to:
store a preview image based on a job setting associated with the job when the job execution apparatus executes the job, the job setting being set by the information processing apparatus.

13. A job processing method performed in a job processing system including an information processing apparatus, a job management apparatus and one or more job execution apparatuses, the information processing apparatus, the job management apparatus, and the one or more job execution apparatuses being connected in a communicable manner, the job processing method comprising:

receiving, by a processor of the job management apparatus, a job and first identification information transmitted from outside of the job management apparatus;

storing therein, by the processor of the job management apparatus, the job and the first identification information in a manner associated with each other;

transmitting, by the processor of one of the one or more job execution apparatuses, second identification information to the job management apparatus;

acquiring, by the processor of the one of the one or more job execution apparatuses, the job, associated with the first identification information specified based on the second identification information, from the job management apparatus; and executing, by the processor of the one of the one or more job execution apparatuses, the job, wherein the job processing method further comprises transmitting, by a first job transmitting unit of the processor of the information processing apparatus, the job and the first identification information to the job management apparatus;

requesting, by a requesting unit of the processor of the information processing apparatus, state information, indicating a state of the job capable of being executed by any one of the one or more job execution apparatuses and associated with the first identification information transmitted to the job management apparatus, from the job management apparatus;

receiving, by a state receiving unit of the processor of the information processing apparatus, state information, indicating a first stage in which the job is accumulated in the job management apparatus and a second stage in which the job acquired from the job management apparatus is executed by any one of the one or more job execution apparatuses as the state information of the job associated with the first identification information, from the job management apparatus;

generating, by an authentication query unit of the processor of the information processing apparatus, a job tracking thread based on a job ID associated with the job, the job tracking thread transmitting job tracking information to the authentication query unit;

receiving, by a state request transmitting unit of the processor of the information processing apparatus, the job tracking information from the authentication query unit, and transmitting, by the state request transmitting unit of the processor of the information processing apparatus, state information of the job along with the job ID to any one of the one or more second external apparatuses, the state information being based on the job tracking information;

receiving, by a job receiving unit of the processor of the job management apparatus, the job and the first identification information from the information processing apparatus;

storing and accumulating, by a job storage unit of a storage device of the job management apparatus, the job and the first identification information received by the job receiving unit in a storage unit in a manner associated with each other;

registering and storing therein, by a state information storage unit of the processor of the job management apparatus, state information of the job accumulated by the job storage unit in the first stage;

receiving, by an identification information receiving unit of the processor of the job management apparatus, second identification information from one of the one or more job execution apparatuses;

transmitting, by a second job transmitting unit of the processor of the job management apparatus, the job to the one of the one or more job execution apparatuses, the job being stored by the job storage unit and associated with the first identification information specified by the second identification information, the state information of the job being at the first stage;

updating, by an updating unit of the processor of the job management apparatus, when the job transmitted by the second job transmitting unit is executed by the one of the one or more job execution apparatus that is a transmission destination, the state information at the first stage with the state information at the second stage;

receiving, by a receiving unit of the processor of the job management apparatus, a request from the requesting unit of the information processing apparatus; and transmitting, by a state transmitting unit of the processor of the job management apparatus, the state information, specified by the request received by the receiving unit and associated with the first identification information, to the information processing apparatus.

* * * * *